(12) United States Patent  (10) Patent No.: US 7,563,178 B2
Rae et al.  (45) Date of Patent: Jul. 21, 2009

(54) GOLF CLUB HEAD

(75) Inventors: John J. Rae, Westminster, CA (US); Nathaniel J. Radcliffe, Huntington Beach, CA (US); Robert J. Horacek, Hennosa Beach, CA (US); Kevin Schaeffer, Vienna, VA (US); Sam G. Lacey, Westminster, CA (US); Jeff D. Brunski, Newport Beach, CA (US)

(73) Assignee: Roger Cleveland Golf, Co., Ltd., Huntington Beach, CA (US)

( * ) Notice: Subject to any disclaimer, the term of this patent is extended or adjusted under 35 U.S.C. 154(b) by 110 days.

(21) Appl. No.: 11/808,091

(22) Filed: Jun. 6, 2007

(65) Prior Publication Data

US 2008/0051218 A1    Feb. 28, 2008

Related U.S. Application Data

(63) Continuation-in-part of application No. 11/717,107, filed on Mar. 13, 2007.

(60) Provisional application No. 60/876,537, filed on Dec. 22, 2006.

(51) Int. Cl.
A63B 53/04    (2006.01)
(52) U.S. Cl. ........................ 473/345; 473/349
(58) Field of Classification Search .......... 473/324–350
See application file for complete search history.

(56) References Cited

U.S. PATENT DOCUMENTS

| 3,693,978 | A | | 9/1972 | East |
| 4,602,787 | A | | 7/1986 | Sugioka et al. |
| 4,762,322 | A | * | 8/1988 | Molitor et al. ............... 473/345 |
| 4,867,458 | A | | 9/1989 | Sumikawa et al. |
| 5,000,454 | A | | 3/1991 | Soda |
| 5,141,230 | A | | 8/1992 | Antonoius |
| 5,295,689 | A | | 3/1994 | Lundberg |
| 5,322,206 | A | | 6/1994 | Harada et al. |
| 5,362,055 | A | | 11/1994 | Rennie |
| 5,397,127 | A | * | 3/1995 | Kawada et al. ............... 473/324 |
| 5,419,559 | A | | 5/1995 | Melanson et al. |
| 5,429,357 | A | | 7/1995 | Kobayashi |
| 5,499,814 | A | | 3/1996 | Lu |
| 5,518,240 | A | | 5/1996 | Igarashi |
| 5,624,331 | A | | 4/1997 | Lo et al. |
| 5,628,698 | A | * | 5/1997 | Sumitomo ................... 473/341 |
| 5,669,827 | A | | 9/1997 | Nagamoto |
| 5,669,828 | A | | 9/1997 | Schmidt |
| 5,704,850 | A | | 1/1998 | Shieh |

(Continued)

FOREIGN PATENT DOCUMENTS

CN    1836759    9/2006

(Continued)

*Primary Examiner*—Alvin A Hunter
(74) *Attorney, Agent, or Firm*—Oliff & Berridge, PLC

(57) ABSTRACT

An exemplary golf club head having additional discretionary mass may be realized by utilizing light-weight materials, an favorable average crown height, and/or articulation points. By using a preferred break length, the additional discretionary mass may be placed low and deep in the club head to improve the location of the center of gravity as well as the inertial properties. In one example, the center of gravity may be positioned to substantially align the sweet spot with the face center of the club head.

15 Claims, 38 Drawing Sheets

U.S. PATENT DOCUMENTS

| | | | |
|---|---|---|---|
| 5,755,627 A | 5/1998 | Yamazaki et al. | |
| RE35,955 E | 11/1998 | Lu | |
| 5,839,975 A | 11/1998 | Lundberg | |
| 5,871,408 A | 2/1999 | Chen | |
| 5,888,148 A | 3/1999 | Allen | |
| 5,935,020 A * | 8/1999 | Stites et al. | 473/345 |
| 5,941,782 A | 8/1999 | Cook | |
| 5,961,394 A | 10/1999 | Minabe | |
| 6,007,435 A | 12/1999 | Chern | |
| 6,017,280 A | 1/2000 | Hubert | |
| 6,048,278 A * | 4/2000 | Meyer et al. | 473/345 |
| 6,074,310 A * | 6/2000 | Ota | 473/345 |
| 6,139,446 A | 10/2000 | Wanchena | |
| 6,146,286 A | 11/2000 | Masuda | |
| 6,162,133 A | 12/2000 | Peterson | |
| 6,193,614 B1 | 2/2001 | Sasamoto et al. | |
| 6,238,300 B1 | 5/2001 | Igarashi | |
| 6,238,302 B1 | 5/2001 | Helmstetter et al. | |
| 6,248,026 B1 | 6/2001 | Wanchena | |
| 6,254,494 B1 * | 7/2001 | Hasebe et al. | 473/349 |
| 6,306,048 B1 | 10/2001 | McCabe et al. | |
| 6,331,149 B1 | 12/2001 | Mikame et al. | |
| 6,340,337 B2 * | 1/2002 | Hasebe et al. | 473/349 |
| 6,344,002 B1 * | 2/2002 | Kajita | 473/330 |
| 6,350,209 B1 | 2/2002 | Chen | |
| 6,354,961 B1 * | 3/2002 | Allen | 473/329 |
| 6,354,963 B1 | 3/2002 | Kodama et al. | |
| 6,390,933 B1 * | 5/2002 | Galloway et al. | 473/345 |
| 6,406,378 B1 * | 6/2002 | Murphy et al. | 473/224 |
| 6,435,982 B1 * | 8/2002 | Galloway et al. | 473/342 |
| 6,471,603 B1 | 10/2002 | Kosmatka | |
| 6,471,604 B2 | 10/2002 | Hocknell et al. | |
| 6,491,592 B2 * | 12/2002 | Cackett et al. | 473/342 |
| 6,524,197 B2 | 2/2003 | Boone | |
| 6,530,847 B1 | 3/2003 | Antonious | |
| 6,565,452 B2 | 5/2003 | Helmstetter et al. | |
| 6,572,489 B2 * | 6/2003 | Miyamoto et al. | 473/291 |
| 6,572,491 B2 * | 6/2003 | Hasebe et al. | 473/349 |
| 6,575,845 B2 | 6/2003 | Galloway et al. | |
| 6,592,466 B2 * | 7/2003 | Helmstetter et al. | 473/224 |
| 6,595,057 B2 * | 7/2003 | Bissonnette et al. | 73/579 |
| 6,648,773 B1 | 11/2003 | Evans | |
| 6,663,504 B2 | 12/2003 | Hocknell et al. | |
| 6,663,506 B2 | 12/2003 | Nishimoto et al. | |
| 6,669,577 B1 | 12/2003 | Hocknell et al. | |
| 6,669,578 B1 | 12/2003 | Evans | |
| 6,679,786 B2 * | 1/2004 | McCabe | 473/305 |
| 6,716,114 B2 * | 4/2004 | Nishio | 473/314 |
| 6,719,645 B2 * | 4/2004 | Kouno | 473/345 |
| 6,729,971 B2 | 5/2004 | Caldwell | |
| 6,749,524 B1 | 6/2004 | Chen | |
| 6,776,726 B2 | 8/2004 | Sano | |
| 6,780,124 B2 | 8/2004 | Lu | |
| 6,783,466 B2 | 8/2004 | Seki et al. | |
| 6,821,214 B2 * | 11/2004 | Rice | 473/345 |
| 6,832,961 B2 | 12/2004 | Sano | |
| 6,875,126 B2 | 4/2005 | Yabu | |
| 6,875,130 B2 * | 4/2005 | Nishio | 473/345 |
| 6,899,637 B2 | 5/2005 | Caldwell | |
| 6,913,546 B2 | 7/2005 | Kakiuchi | |
| 6,929,565 B2 | 8/2005 | Nakahara et al. | |
| 6,939,247 B1 * | 9/2005 | Schweigert et al. | 473/314 |
| 6,945,876 B2 | 9/2005 | Nakahara et al. | |
| 6,984,180 B2 | 1/2006 | Hasebe | |
| 7,008,332 B2 | 3/2006 | Liou | |
| 7,022,029 B2 | 4/2006 | Caldwell | |
| 7,025,693 B2 | 4/2006 | Sugimoto | |
| 7,037,214 B2 | 5/2006 | Nakahara et al. | |
| 7,056,229 B2 | 6/2006 | Chen | |
| 7,059,973 B2 | 6/2006 | Erickson et al. | |
| 7,066,835 B2 | 6/2006 | Evans et al. | |
| 7,070,512 B2 * | 7/2006 | Nishio | 473/319 |
| 7,077,762 B2 * | 7/2006 | Kouno et al. | 473/314 |
| 7,101,289 B2 | 9/2006 | Gibbs et al. | |
| 7,108,614 B2 | 9/2006 | Lo | |
| 7,121,958 B2 | 10/2006 | Chieng et al. | |
| 7,128,664 B2 | 10/2006 | Onoda et al. | |
| 7,134,972 B2 | 11/2006 | Hsu et al. | |
| 7,144,333 B2 * | 12/2006 | Murphy et al. | 473/329 |
| 7,147,572 B2 * | 12/2006 | Kohno | 473/314 |
| 7,163,468 B2 * | 1/2007 | Gibbs et al. | 473/329 |
| 7,166,038 B2 * | 1/2007 | Williams et al. | 473/329 |
| 7,169,060 B2 * | 1/2007 | Stevens et al. | 473/329 |
| 7,189,165 B2 | 3/2007 | Yamamoto | |
| 7,211,005 B2 * | 5/2007 | Lindsay | 473/310 |
| 7,214,144 B2 | 5/2007 | Tseng | |
| 7,217,199 B2 | 5/2007 | Nakahara et al. | |
| 7,255,653 B2 | 8/2007 | Saso | |
| 7,258,630 B2 | 8/2007 | Erickson et al. | |
| 7,261,645 B2 | 8/2007 | Oyama | |
| 7,261,646 B2 | 8/2007 | De Shiell et al. | |
| 7,273,419 B2 | 9/2007 | Evans et al. | |
| 7,278,927 B2 * | 10/2007 | Gibbs et al. | 473/329 |
| 7,281,985 B2 * | 10/2007 | Galloway | 473/246 |
| 7,281,993 B2 | 10/2007 | Oyama | |
| 7,297,074 B2 | 11/2007 | Kumamoto | |
| 7,300,360 B2 * | 11/2007 | Oyama | 473/314 |
| 7,311,613 B2 | 12/2007 | Stevens et al. | |
| 7,311,614 B2 | 12/2007 | Kunamoto | |
| 7,396,291 B2 | 7/2008 | Lo | |
| 7,396,297 B2 * | 7/2008 | Hirano | 473/345 |
| 7,399,237 B2 | 7/2008 | Evans et al. | |
| 7,410,428 B1 | 8/2008 | Dawson et al. | |
| 7,413,520 B1 * | 8/2008 | Hocknell et al. | 473/345 |
| 7,438,647 B1 * | 10/2008 | Hocknell | 473/334 |
| 2002/0183134 A1 | 12/2002 | Allen et al. | |
| 2003/0032500 A1 | 2/2003 | Nakahara et al. | |
| 2003/0083151 A1 | 5/2003 | Nakahara et al. | |
| 2003/0134693 A1 | 7/2003 | Nakahara et al. | |
| 2006/0058114 A1 | 3/2006 | Evans et al. | |
| 2006/0058115 A1 | 3/2006 | Erickson et al. | |
| 2006/0079349 A1 * | 4/2006 | Rae et al. | 473/345 |
| 2006/0154747 A1 | 7/2006 | Beach | |
| 2007/0004531 A1 | 1/2007 | Galloway et al. | |
| 2007/0232408 A1 * | 10/2007 | Horacek et al. | 473/324 |
| 2007/0293345 A1 | 12/2007 | Serrano et al. | |
| 2008/0051210 A1 * | 2/2008 | Park et al. | 473/291 |
| 2008/0051215 A1 | 2/2008 | Rae et al. | |
| 2008/0051218 A1 | 2/2008 | Rae et al. | |
| 2008/0058116 A1 | 3/2008 | Rae et al. | |
| 2008/0176674 A1 | 7/2008 | Horacek et al. | |

FOREIGN PATENT DOCUMENTS

| | | | |
|---|---|---|---|
| EP | 1782908 | | 5/2007 |
| GB | 2 280 380 | | 2/1995 |
| JP | 53140136 A | * | 12/1978 |
| JP | A-01-017668 | | 1/1989 |
| JP | A-04-082574 | | 3/1992 |
| JP | A-06-142236 | | 5/1994 |
| JP | A-06-285568 | | 10/1994 |
| JP | 06-339550 | | 12/1994 |
| JP | 06343721 A | * | 12/1994 |
| JP | 07178207 A | * | 7/1995 |
| JP | 09140836 A | * | 6/1997 |
| JP | 09253242 A | * | 9/1997 |
| JP | A-09-313653 | | 12/1997 |
| JP | A-10-085369 | | 4/1998 |
| JP | A-10-277181 | | 10/1998 |
| JP | A-10-314347 | | 12/1998 |
| JP | A-10-314348 | | 12/1998 |
| JP | 11019253 A | * | 1/1999 |
| JP | 11033145 A | * | 2/1999 |
| JP | 11-128413 | | 5/1999 |

| | | | | | | |
|---|---|---|---|---|---|---|
| JP | A-11-313906 | 11/1999 | JP | 2001321466 A | * | 11/2001 |
| JP | 2000288133 A | * 10/2000 | JP | A-2002-301174 | | 10/2002 |
| JP | 2000300701 A | * 10/2000 | JP | A-2003-230641 | | 8/2003 |
| JP | A-2000-334071 | 12/2000 | JP | A-2003-265656 | | 9/2003 |
| JP | A-2000-342721 | 12/2000 | JP | A-2005-040232 | | 2/2005 |
| JP | A-2000-342725 | 12/2000 | JP | 2005130935 A | * | 5/2005 |
| JP | A-2001-070484 | 3/2001 | TW | 469140 | | 12/2001 |
| JP | 2001231888 A | * 8/2001 | | | | |
| JP | A-2001-231896 | 8/2001 | * cited by examiner | | | |

US 7,563,178 B2

GOLF CLUB HEAD

This is a Continuation-in-Part of application Ser. No. 11/717,107, filed Mar. 13, 2007, which claims the benefit of U.S. Provisional Application No. 60/876,537 filed Dec. 22, 2006. The disclosures of the prior applications are hereby incorporated by reference herein in their entirety.

A Computer Program Listing Appendix on compact disk is included with this application.

BACKGROUND

Wood-type golf club heads generally have a mass in the range of about 150-250 g. A portion of this mass sustains the structural integrity of the club head. The remaining mass, referred to as "discretionary" mass, may be strategically distributed to improve the head's mass properties and/or inertial characteristics.

Known methods of increasing the available discretionary mass, e.g. reducing the thickness of the club head walls, produce minimum benefits. Accordingly, the capacity of modern wood-type club heads to deliver improved performance is qualified, in part, by the amount of discretionary mass attainable through conventional methods.

Generally, golfers have a natural tendency to strike the golf ball about the face center of the club head. The face center, in most wood-type clubs, is the point on the club face where maximum face rebound occurs at ball impact and is also known as the Coefficient of Restitution (COR) "hot spot". Although ball impact at the COR "hot spot" yields maximum face rebound, it may produce inaccurate shots because, in conventional club heads, the "sweet spot" (the orthogonal projection of the head's center of gravity (CG) onto the striking surface of the head and the point on the club face where no head rotation or gear effect occurs) is generally located above the COR "hot spot". Hence, for conventional wood-type clubs, only a single performance variable, i.e., either maximum face rebound associated with ball impact about the COR "hot spot" or shot accuracy associated with ball impact about the "sweet spot", may be augmented for any one golf shot.

Generally, ball impact about the face center of a conventional wood-type club exaggerates both the head rotation and gear effect of the club head, causing a loss of carry distance and accuracy.

Shot accuracy and distance are also affected by the depth of the CG relative to the club face. In conventional drivers, the CG is typically positioned near the face. Shallow CG placement decreases dynamic flexing of the shaft toward alignment with the CG, thus decreasing the beneficial lofting of the head and the closing of the face at impact with the ball. Additionally, a shallow CG decreases the radius of rotation of the face on off-center hits, thus decreasing shot accuracy.

SUMMARY

A need exists for a golf club head having additional discretionary mass, an improved center of gravity location, increased dynamic loft attributes at ball impact, and reduced hook/slice tendencies.

In one example, a golf club head according to one or more aspects of the present invention may include a total mass between about 150 g and about 250 g and at least one non-metallic portion comprising at least about 8% of the total mass. The club head may further comprise a break length, between about 96 mm and about 140 mm, measured at a vertical distance between about 5 mm and about 10 mm from a ground plane.

In another example, a golf club head according to one or more aspects of the present invention may include a primary heel-toe moment of inertia of at least about 3500 g·cm² and a total mass between about 150 g and about 250 g. The golf club head may further include a club head component comprising a secondary heel-toe moment of inertia that is between about 85% and about 99% of the primary heel-toe moment of inertia. A light-weight component, comprising between at least about 8% of the total mass, may be coupled to the club head component and may comprise a connecting member.

In another example, a golf club head according to one or more aspects of the present invention may include a primary high-low moment of inertia of at least about 2500 g·cm² and a total mass between about 150 g and about 250 g. The golf club head may further include a club head component comprising a secondary high-low moment of inertia that is between about 85% and about 99% of the primary high-low moment of inertia. A light-weight component, comprising between at least about 8% of the total mass, may be coupled to the club head component and may comprise a connecting member.

In another example, a golf club head according to one or more aspects of the present invention may include a total mass between about 150 g and about 250 g and at least one non-metallic portion comprising at least about 8% of the total mass. The club head may further comprise a plurality of reference paths, at least one of the plurality of reference paths comprising an average height between about 20 mm and about 45 mm.

In another example, a golf club head according to one or more aspects of the present invention may include a total mass between about 150 g and about 250 g and at least one non-metallic portion comprising at least about 8% of the total mass. The club head may further comprise a plurality of reference paths, at least one of the plurality of reference paths comprising at least two articulation points.

In another example, a golf club head according to one or more aspects of the present invention may include a face portion, a body portion, and a peripheral attachment zone between the face portion and the body portion. The peripheral attachment zone may comprise a perimetric length and at least two discrete welds comprising between about 1% and about 40% of the perimetric length.

These and other features, aspects, and advantages of the golf club head according to the invention in its various aspects and demonstrated by one or more of the various examples will become apparent after consideration of the ensuing description, the accompanying drawings, and the appended claims. The drawings described below are for illustrative purposes only and are not intended to limit the scope of the present invention.

BRIEF DESCRIPTION OF THE DRAWINGS

Exemplary implementations will now be described with reference to the accompanying drawings, wherein.

In the figures, like elements are designated by like reference numerals.

DETAILED DESCRIPTION

The following examples of the golf club head according to one or more aspects of the invention will be described using one or more definitions, provided below.

Figure 1:
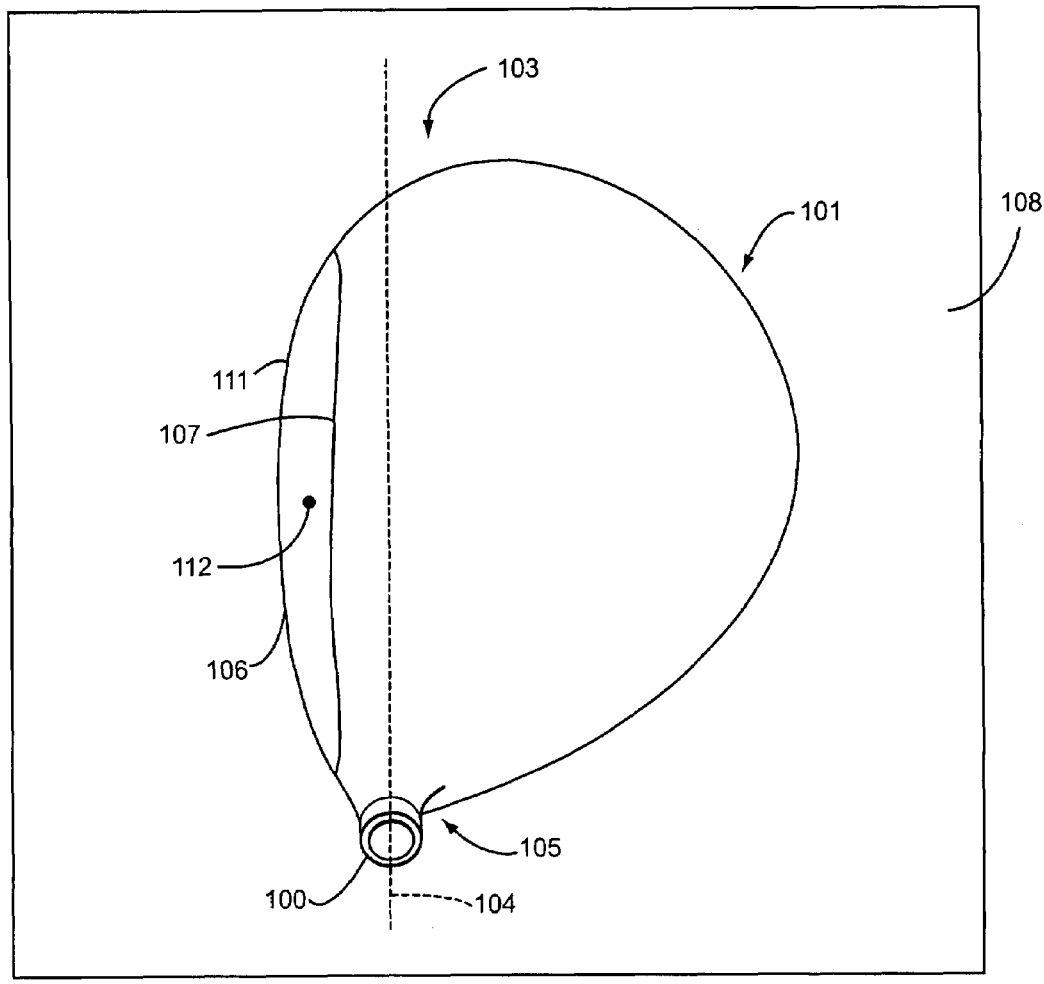
FIG. 1 is a top plan view of an exemplary golf club in accordance with one or more aspects of the present invention.
Figure 1A:
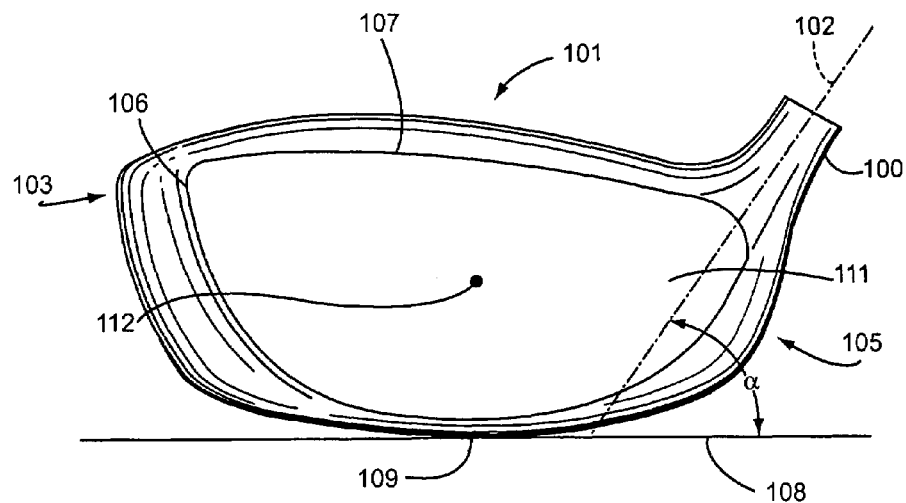
FIG. 1a is a front elevational view of the golf club head of FIG. 1.

Referring to FIGS. 1 and 1A, a club head 101 may comprise a toe 103, a heel 105, a hosel 100 having a central axis (centerline) 102, a sole portion 109 and a face portion 106. The face portion 106 includes a striking surface 111, a top edge 107, and a face center 112.

"Face center", e.g., the face center 112, as used herein, may be located using the general methodology described in the Procedure for Measuring the Flexibility of a Golf Club head, Revision 2.0, Section 6.1 (Mar. 25, 2005), as administered by the United states Golf Association (USGA) and R&A Rules Limited (R&A). Steps 6.1 through 6.1.4 of the Procedure for Measuring the Flexibility of a Golf Club Head are herein incorporated by reference in their entirety. As shown in FIG. 1c, the face center 112 may be located using a template 113, having a coordinate system with a heel-toe axis orthogonal to a sole-crown axis. An aperture 119 may be located at the origin of the coordinate system and each axis may be divided into evenly spaced increments. The template 113 may be composed of a flexible material, e.g., a transparent polymer. The template is used as follows:

1) The template 113 is placed on the striking surface 111 with the heel-toe axis substantially parallel to the leading edge 107. The template is then moved back and forth in the heel-toe direction along the striking surface 111 until the heel and toe measurements at the opposite edges of the striking surface 111 are equal.
2) The template 113 is moved back and forth in the sole-crown direction along the striking surface 111 until the sole and crown measurements at the opposite edges of the striking surface 111 are equal.
3) The template 113 is moved with respect to the striking surface 111 as described in steps 1 and 2, above, until the heel and toe as well as the sole and crown measurements along the corresponding axes are equal.

A circle is then marked on the face via the aperture 119 to indicate the face center 112.

Figure 1B:
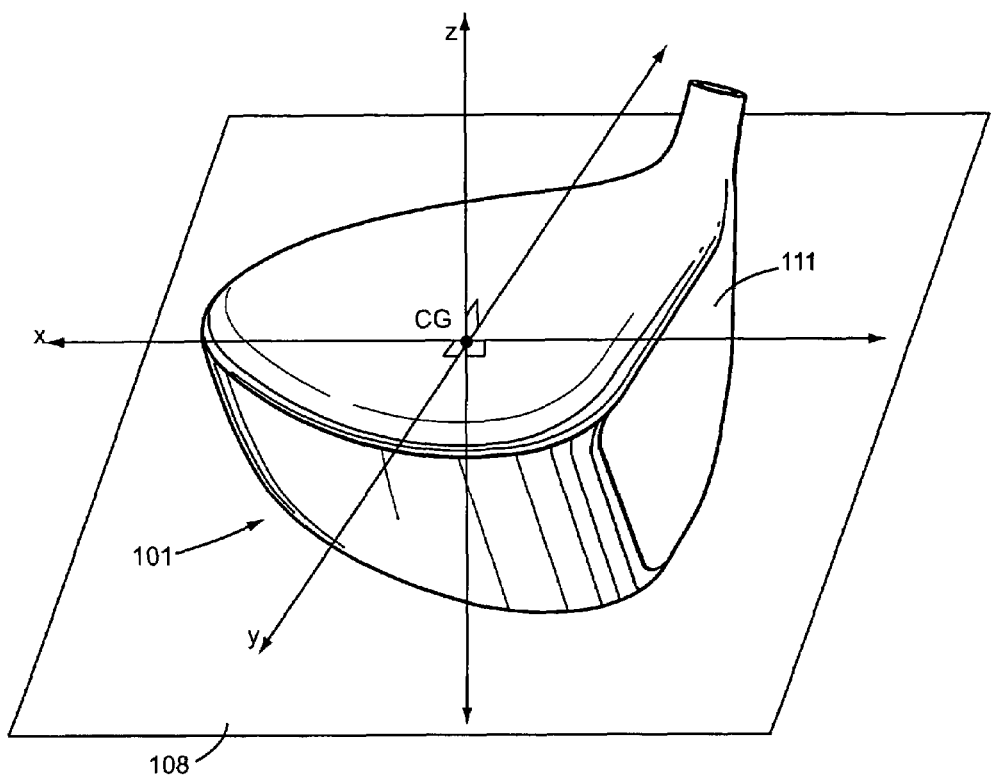
FIG. 1b is a front perspective view of the golf club head of FIG. 1.
Figure 1C:
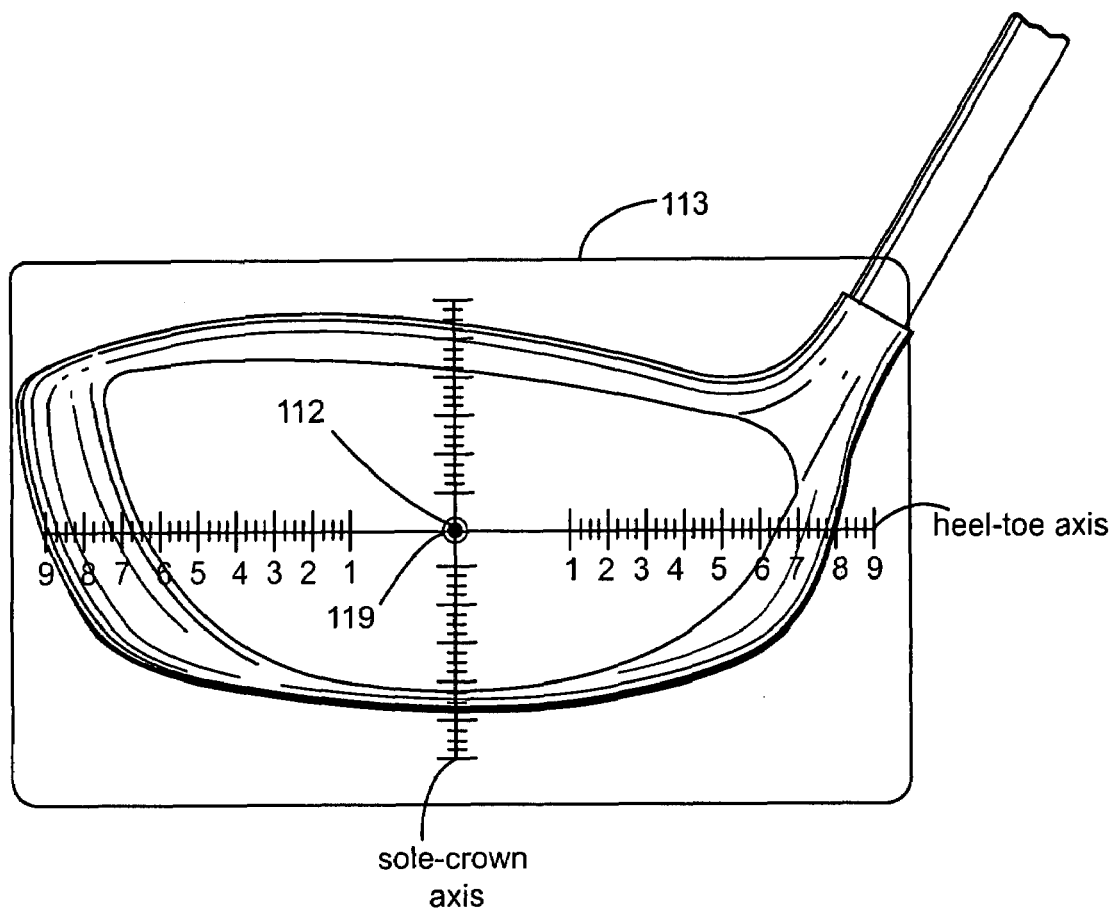
FIG. 1c shows a template for locating the face center of a golf club head.

Referring to FIG. 1B, for purposes of determining moments of inertia of a golf club head according to one or more aspects of the invention, a three-dimensional coordinate system, having axes x, y, and z, has its origin at the center of gravity CG of the club head 101, with the club head in the reference position. The z-axis extends through the center of gravity CG generally parallel to the striking surface 111 in a vertical direction relative to the ground plane 108. The y-axis extends through the center of gravity CG substantially parallel to the striking surface 111 and perpendicular to the z-axis. The x-axis extends through the center of gravity CG and is perpendicular to the z-axis and the y-axis.

The moment of inertia $I_{zz}$ about the z-axis and the moment of inertia $I_{yy}$ about the y-axis ($I_{yy}$) of the club head 101 (i.e., the primary heel-toe MOI and the primary high-low MOI)

may be found using the general methodology disclosed in the Procedure for Measuring the Moment of Inertia of Golf Clubheads, Revision 1.0 (Apr. 12, 2006), as administered by the United States Golf Association (USGA) and R&A Rules Limited (R&A), with procedural modifications for measuring $I_{yy}$ discussed below. The USGA Procedure for Measuring the Moment of Inertia of Golf Clubheads is herein incorporated by reference in its entirety. The associated "USGA MOI Calculation.xls" program, in an executable form including its listing, is in the attached Computer Program Listing Appendix on compact disk.

Figure 2A:
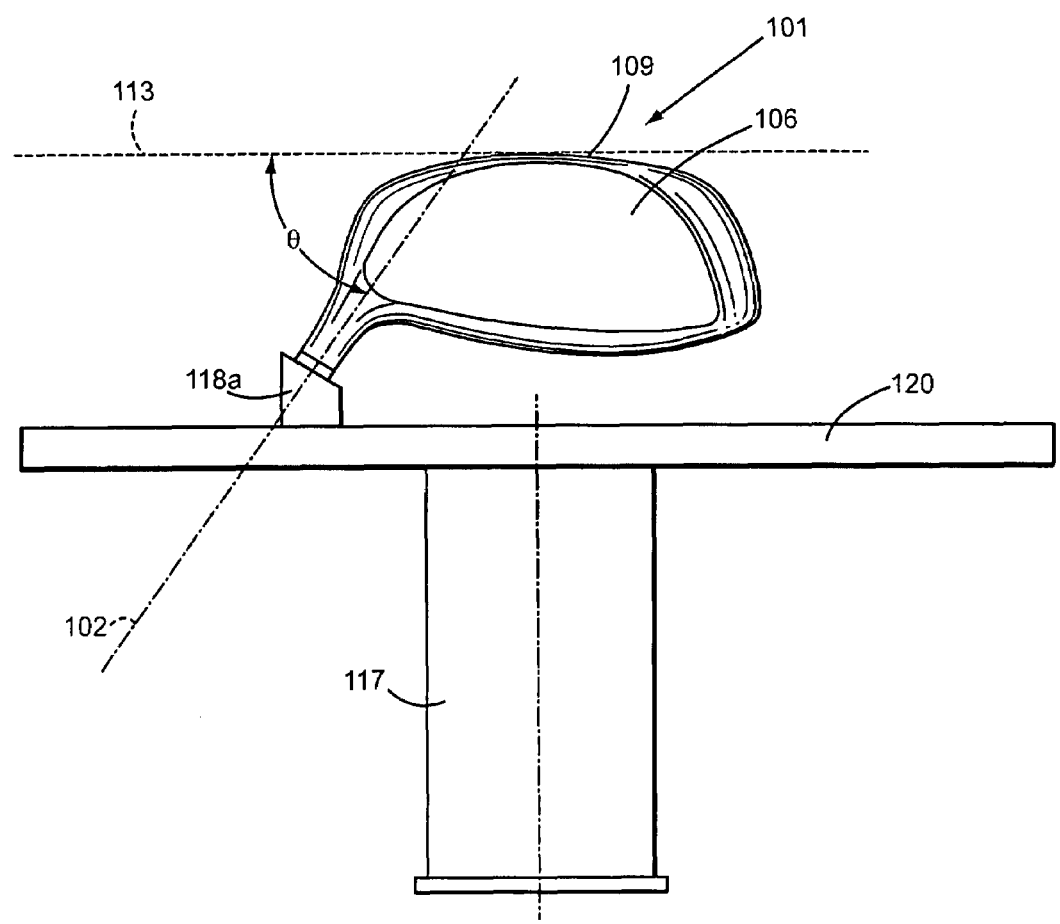
FIG. 2A is a front elevational view of the golf club head of FIG. 1, positioned on a moment of inertia measurement instrument for purposes of measuring heel-toe MOI.
Figure 2B:
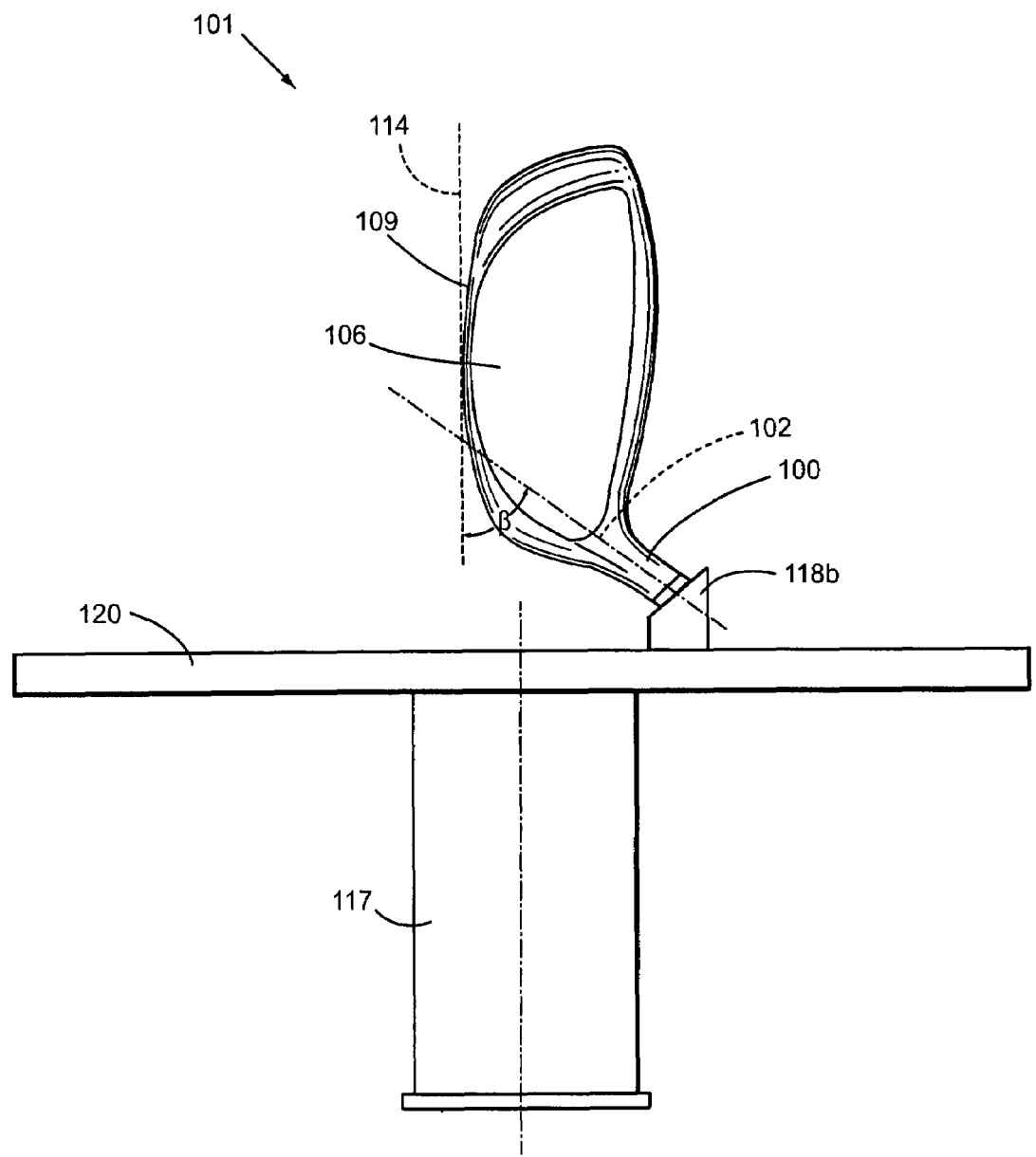
FIG. 2B is a front elevational view of the golf club head of FIG. 1, positioned on a moment of inertia measurement instrument for purposes of measuring high-low MOI.

As described in the USGA Procedure for Measuring the Moment of Inertia of Golf Clubheads, a measuring instrument 117 (see FIGS. 2A and 2B), designed for determining the moment of inertia of test parts having mass properties and overall dimensions similar to that of a golf club head, may be used to obtain the moment of inertia $I_{zz}$ (the primary heel-toe MOI) about the z-axis and the moment of inertia $I_{yy}$ (the primary high-low MOI) about the y-axis of the golf club head 101. Referring once again to FIGS. 2A and 2B, a horizontal jig plate 120, described in the USGA Procedure for Measuring the Moment of Inertia of Golf Clubheads, is attached to the measuring instrument 117, such that the jig plate and the measurement instrument are level.

Figure 2C:
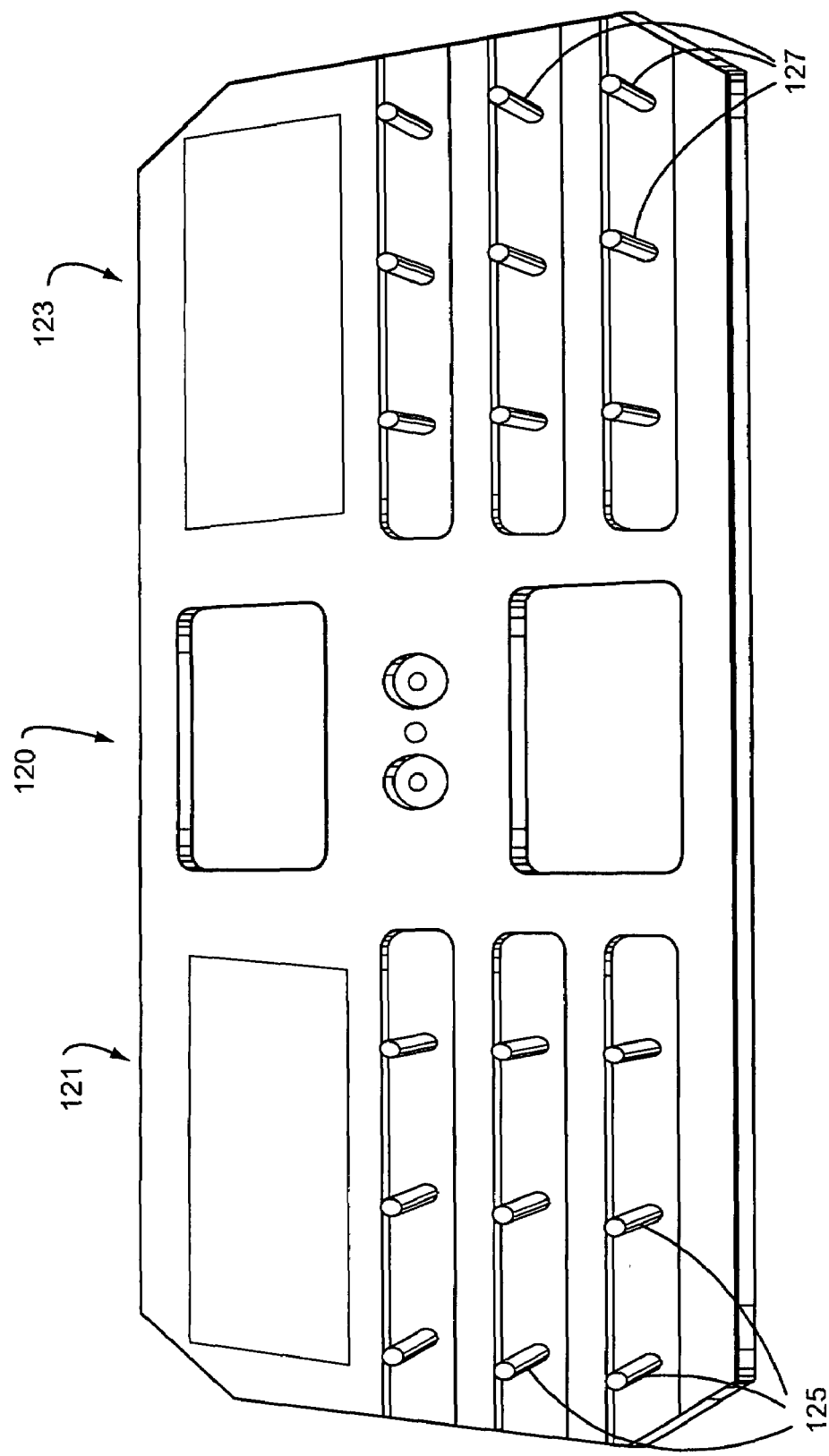
FIG. 2C is a perspective view of a jig plate.

As shown in FIG. 2C, the jig plate 120 has a first side 121 and a second side 123. The first side 121 includes mounting pins 125 and the second side 123 includes mounting pins 127. Pins 125 and 127 comprise rows arranged longitudinally with respect to the jig plate and columns arranged transversely with respect to the jig plate.

For purposes of measuring the primary heel-toe MOI of the club head 101 about the z-axis, an adapter 118a (FIG. 2A) is utilized to orient the club head with respect to the jig plate 120 so that the sole portion 109 of the club head is facing up and the club head 101 is disposed such that the angle θ between the hosel centerline 102 and an imaginary horizontal plane 113 is substantially 60°. Furthermore, the face portion 106 of the club head is substantially parallel to the rows of mounting pins 125 and 127. For purposes of measuring the primary heel-toe MOI of the club head 101, the pins 125 on the first side 121 of the jig plate 120 are used for right-handed club heads and the pins 127 on the second side 123 of the jig plate 120 are used for left-handed club heads.

For purposes of measuring the primary high-low MOI of the club head 101 about the y-axis, an adapter 118b (FIG. 2B) is utilized to orient the club head with respect to the jig plate 120 so that the sole portion 109 of the club head is substantially vertical. In other words, the club head 101 is disposed with respect to the jig plate 120 such that the angle β between the hosel centerline 102 and an imaginary vertical plane 114, generally parallel to the sole portion 109, is substantially 60°.

Furthermore, as provided in the USGA Procedure for Measuring the Moment of Inertia of Golf Clubheads, the face portion 106 of the club head is substantially parallel to the rows of mounting pins 125 and 127. For purposes of measuring the primary high-low MOI of the club head 101, the pins 125 on the first side 121 of the jig plate 120 are used for left-handed club heads and the pins 127 on the second side 123 of the jig plate 120 are used for right-handed club heads.

Figure 3:
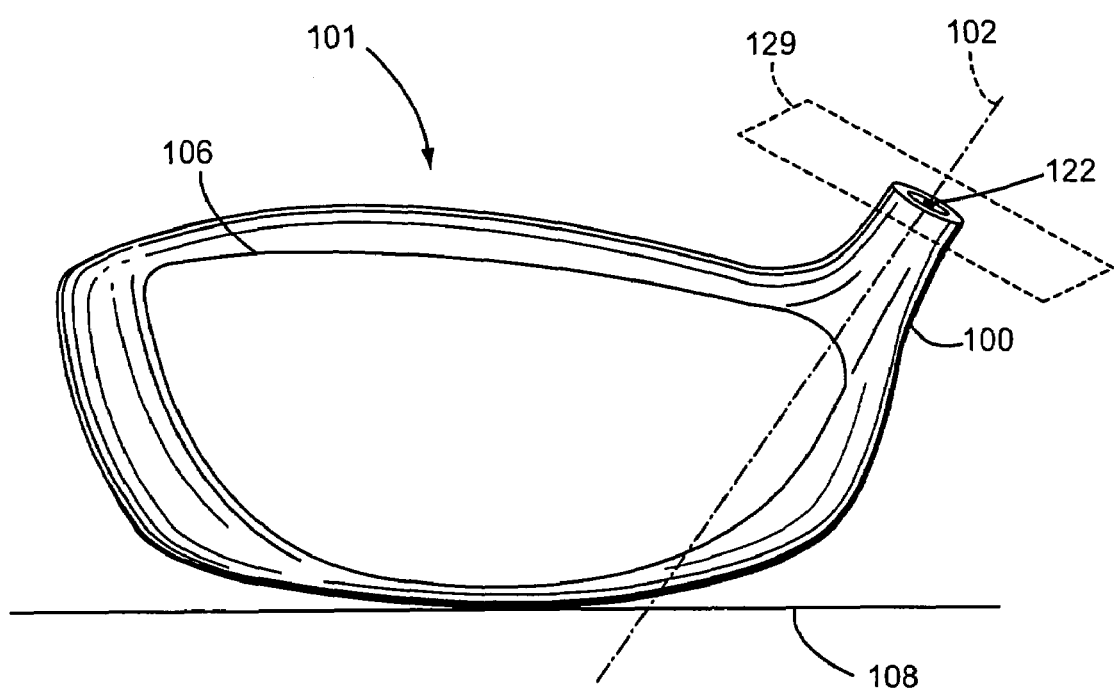
FIG. 3 is a front elevational view of the golf club head of FIG. 1.

Referring to FIG. 3, "hosel center", e.g., the hosel center 122, as used herein, refers to the point of intersection between the hosel centerline 102 and an imaginary planar surface 129, characterizing the terminus of the hosel 100.

Figure 3A:
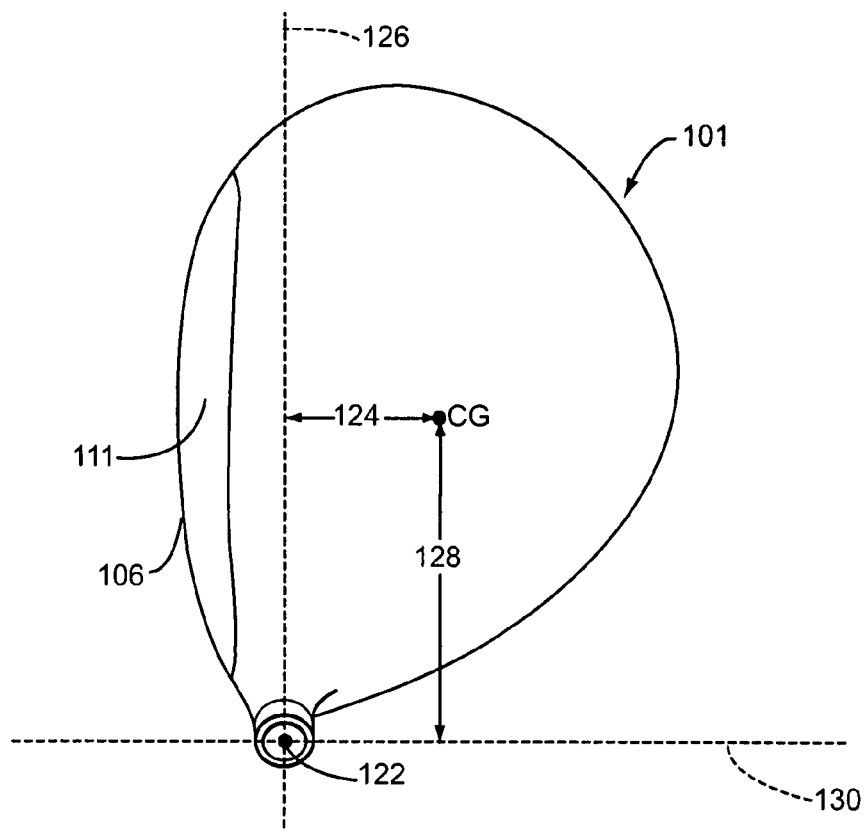
FIG. 3A is a top plan view of the golf club head of FIG. 1.

The location of the center of gravity CG of the club head 101 in the reference position may be described as follows:

(1) Referring to FIG. 3A, the center of gravity CG is disposed a first horizontal distance 124 from an imaginary vertical plane 126. The plane 126 is oriented substantially parallel to the striking surface 111 and contains the hosel center 122. The distance 124 is the shortest horizontal distance from plane 126 to the center of gravity CG.

(2) Referring to FIG. 3A, the center of gravity CG is located a second horizontal distance 128 from an imaginary vertical plane 130. The plane 130 is oriented substantially perpendicular to the striking surface 111 and contains the hosel center 122. The distance 128 is the shortest horizontal distance from the plane 130 to the center of gravity CG.

Figure 3B:
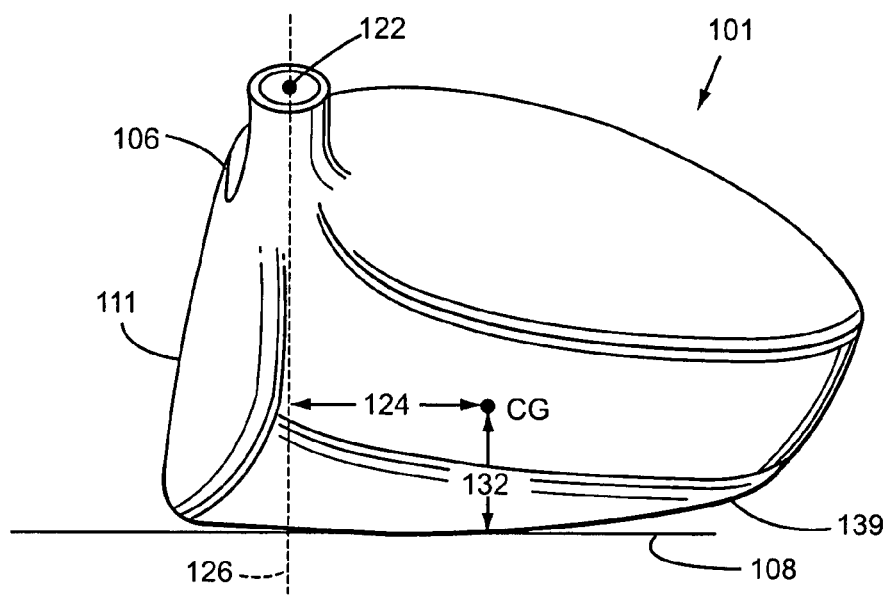
FIG. 3B is a heel side elevational view of the golf club head of FIG. 1.

(3) Referring to FIG. 3B, the center of gravity CG is located a vertical distance 132 from the ground plane 108. The distance 132 is the vertical distance from the ground plane 108 to the center of gravity CG.

Figure 4:
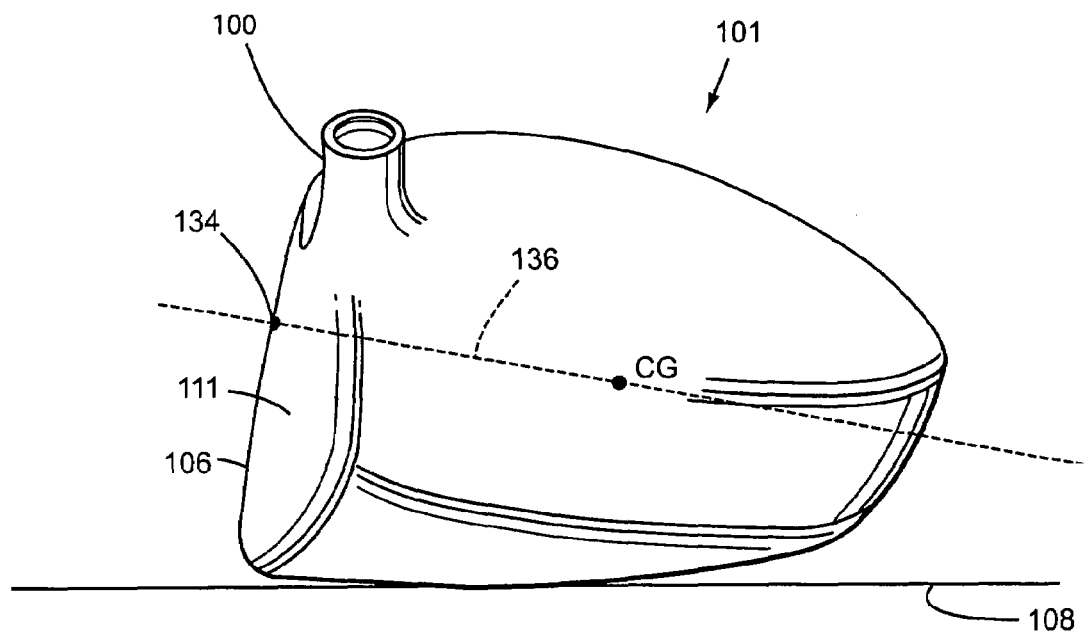
FIG. 4 is a heel side elevational view of the golf club head of FIG. 1.

Referring to FIG. 4, "sweet spot", e.g., the sweet spot 134, as used herein, refers to the point of intersection between the striking surface 111 and an imaginary line 136 that is substantially perpendicular to the striking surface 111 and passes through the center of gravity CG of the club head 101.

Figure 5:
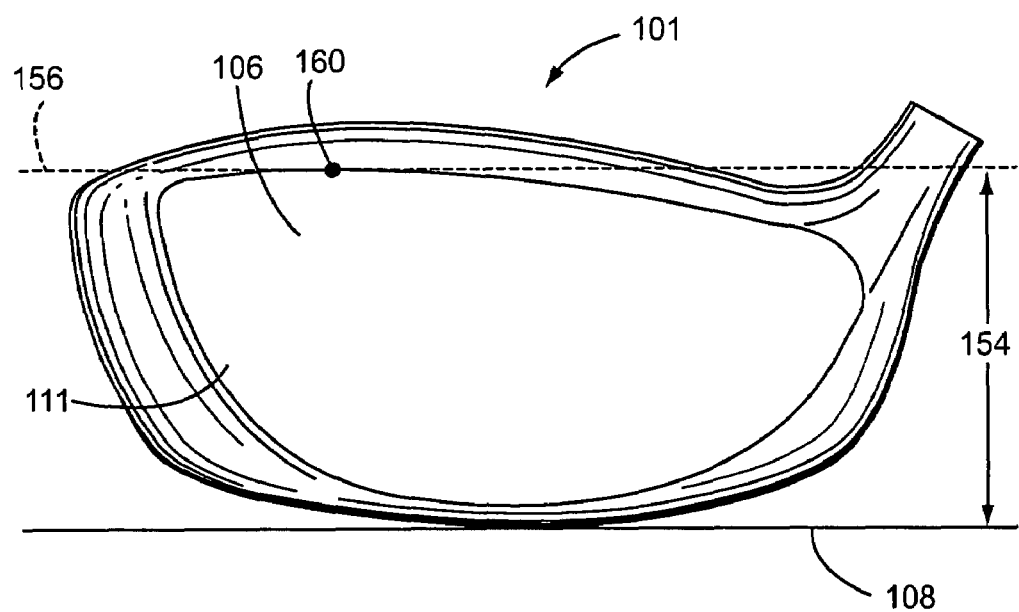
FIG. 5 is a front elevational view of the golf club head of FIG. 1.

Referring to FIG. 5, "face height", e.g., the face height 154, as used herein, denotes a vertical distance between a first horizontal plane 156 passing through the highest point 160 of the striking surface 111, and the ground plane 108, with the club head in the reference position 101.

Figure 6:
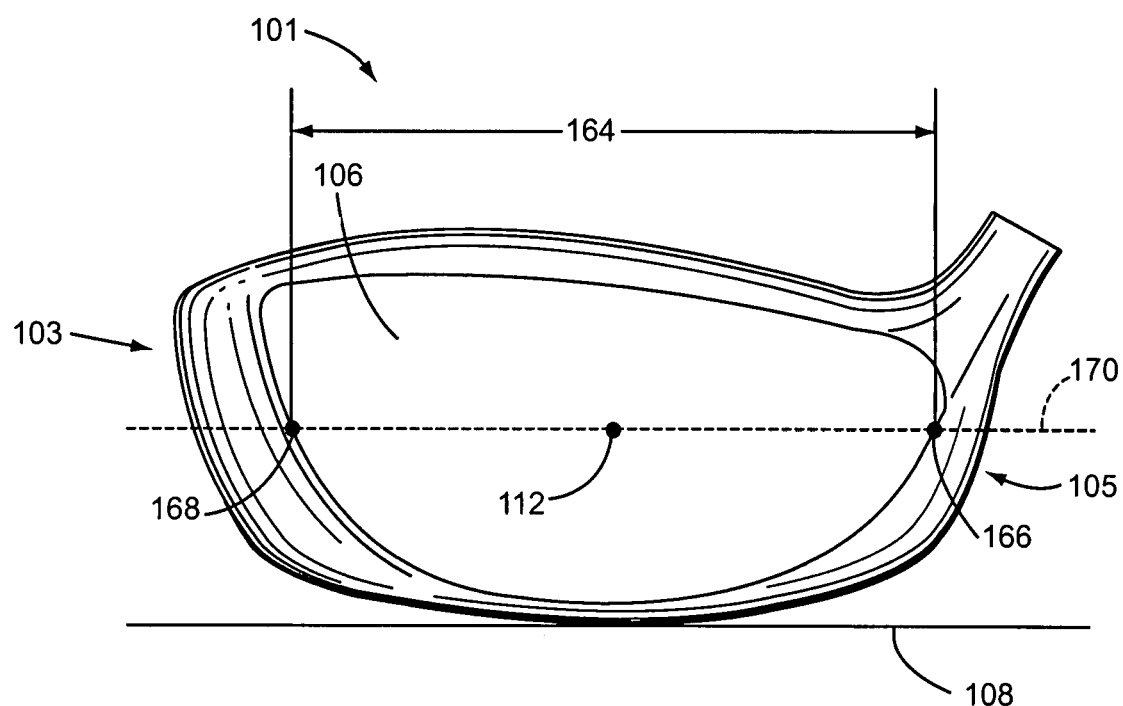
FIG. 6 is a front elevational view of the golf club head of FIG. 1.

Referring to FIG. 6, "face length", e.g., the face length 164, as used herein, refers to a shortest horizontal distance between points 166 and 168, with the club head 101 in the reference position. The point 166 and 168 are characterized by the intersection of an imaginary horizontal plane 170, passing through the face center 112, with the peripheral edge of the striking surface 111 adjacent the heel 105 and the toe 103, respectively, of the club head 101.

Figure 7:
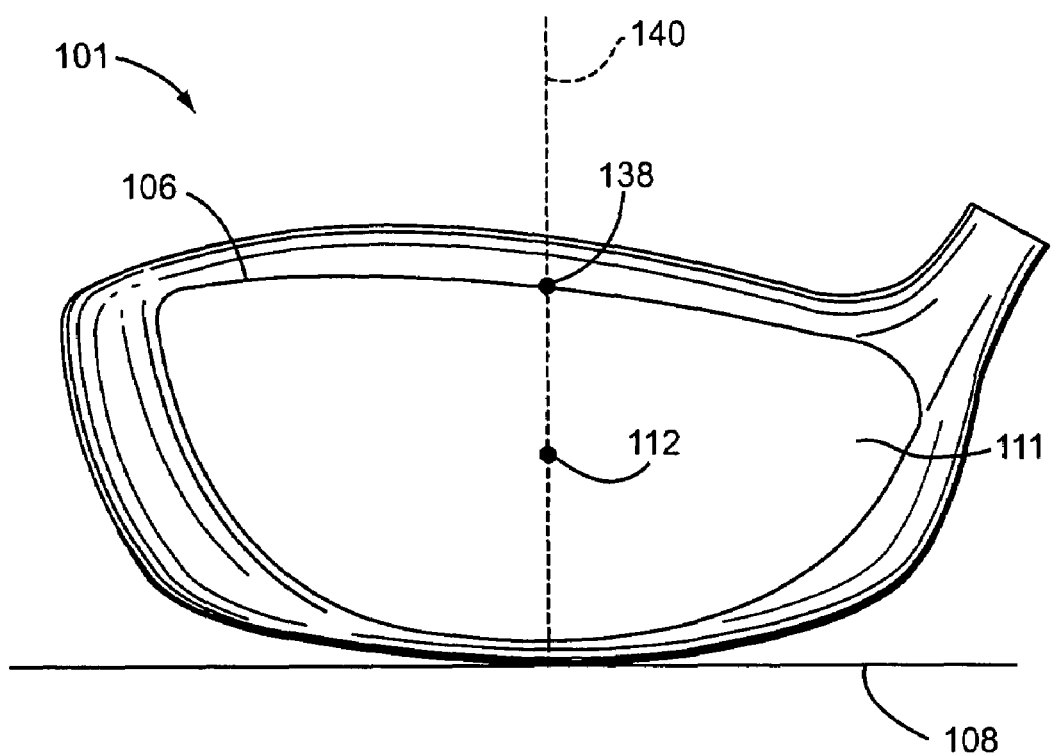
FIG. 7 is a front elevational view of the golf club head of FIG. 1.

Referring to FIG. 7, "center apex", e.g., the center apex 138, as used herein, refers to a point of intersection between an imaginary vertical plane 140 and the top of the striking surface 111, with the club head 101 in the reference position. The plane 140 is oriented substantially perpendicular to the striking surface 111 and passes through the face center 112.

Figure 8:
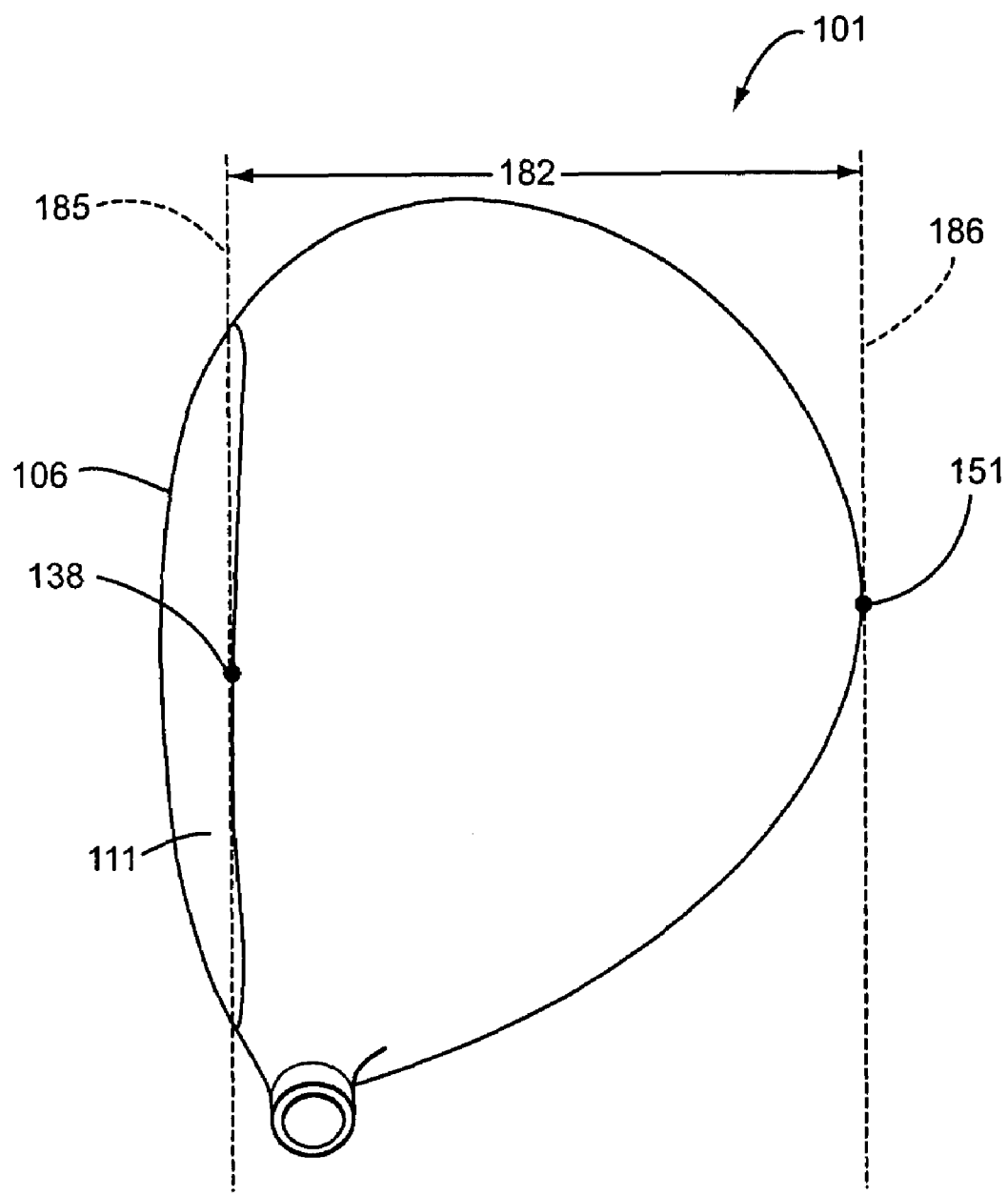
FIG. 8 is a top plan view of the golf club of FIG. 1.

Referring to FIG. 8, "overall length", e.g., the overall length 182, as used herein, denotes the shortest horizontal distance between a first imaginary vertical plane 185, substantially parallel to the striking surface 111 and passing through the center apex 138, and a second imaginary vertical plane 186, that is parallel to the plane 185 and passes through the furthest rearwardly projecting point 151 of the club head 101 in the reference position, opposite the striking surface 111.

Figure 9:
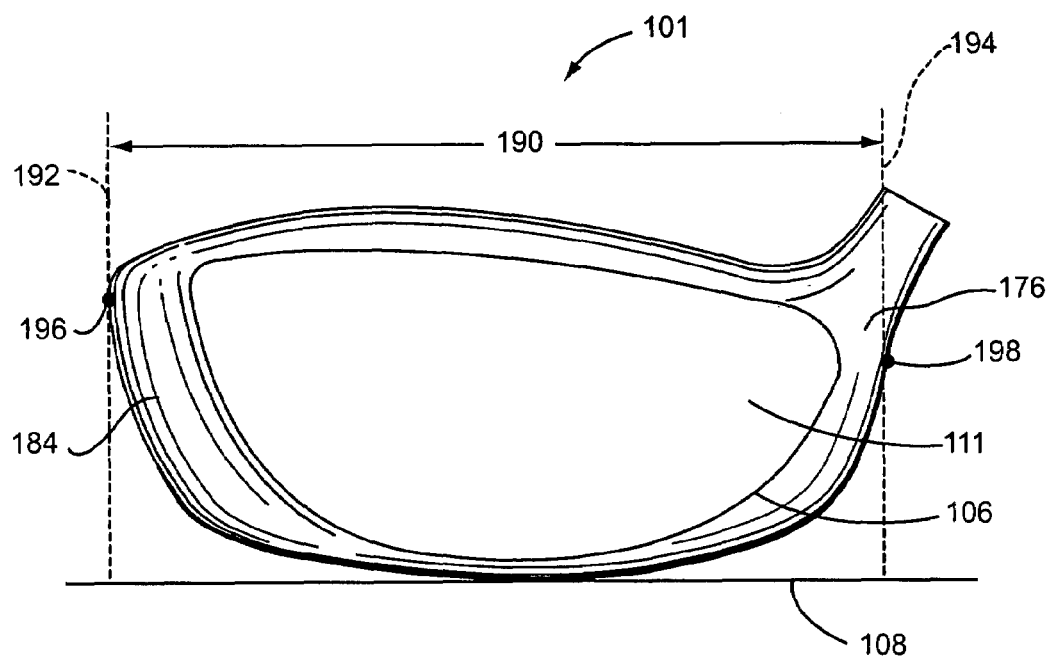
FIG. 9 is a front elevational view of the golf club of FIG. 1.

Referring to FIG. 9, "overall width", e.g., the overall width 190, as used herein, denotes the shortest horizontal distance between a first imaginary vertical plane 192, substantially perpendicular to the striking surface 111 and passing through the furthest laterally projecting point 196 of the toe 184, and a second imaginary vertical plane 194 that is substantially perpendicular to the striking surface 111 and passes through the furthest laterally projecting point 198 of the heel 176 at a height of ¾", with the club head 101 in the reference position.

Figure 10:
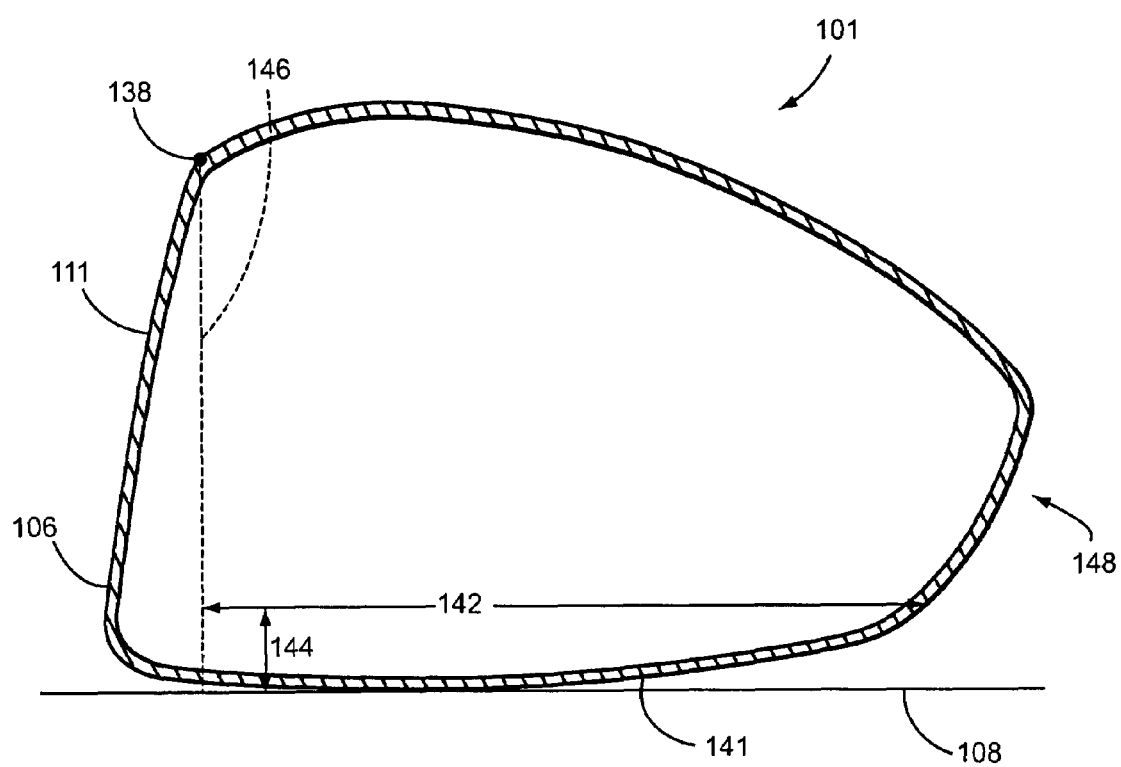
FIG. 10 is a cross-sectional view of the golf club head of FIG. 1.

Referring to FIG. 10, "break length", e.g., the break length 142, as used herein, denotes a horizontal distance, at a vertical distance 144 relative to the ground plane 108, in a direction substantially perpendicular to the striking surface 111, between an imaginary vertical line 146 and the outer surface of a rear portion 148 of the club head 101, with the club head in the reference position. The imaginary vertical line 146 extends from the center apex 138 to the ground plane 108.

Figure 19A:
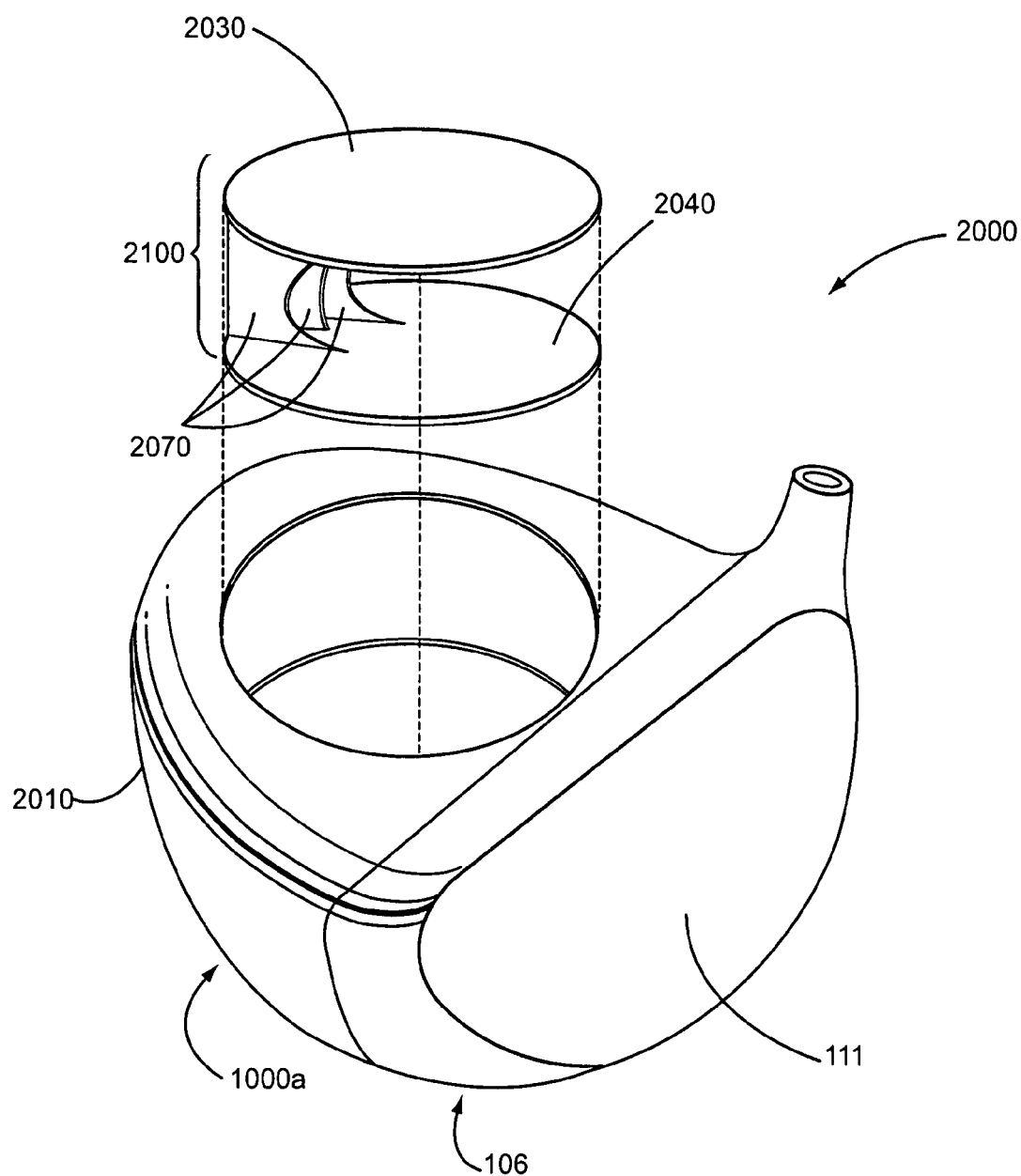
FIG. 19A is an exploded view of a golf club head according to one or more aspects of the present invention.
Figure 19B:
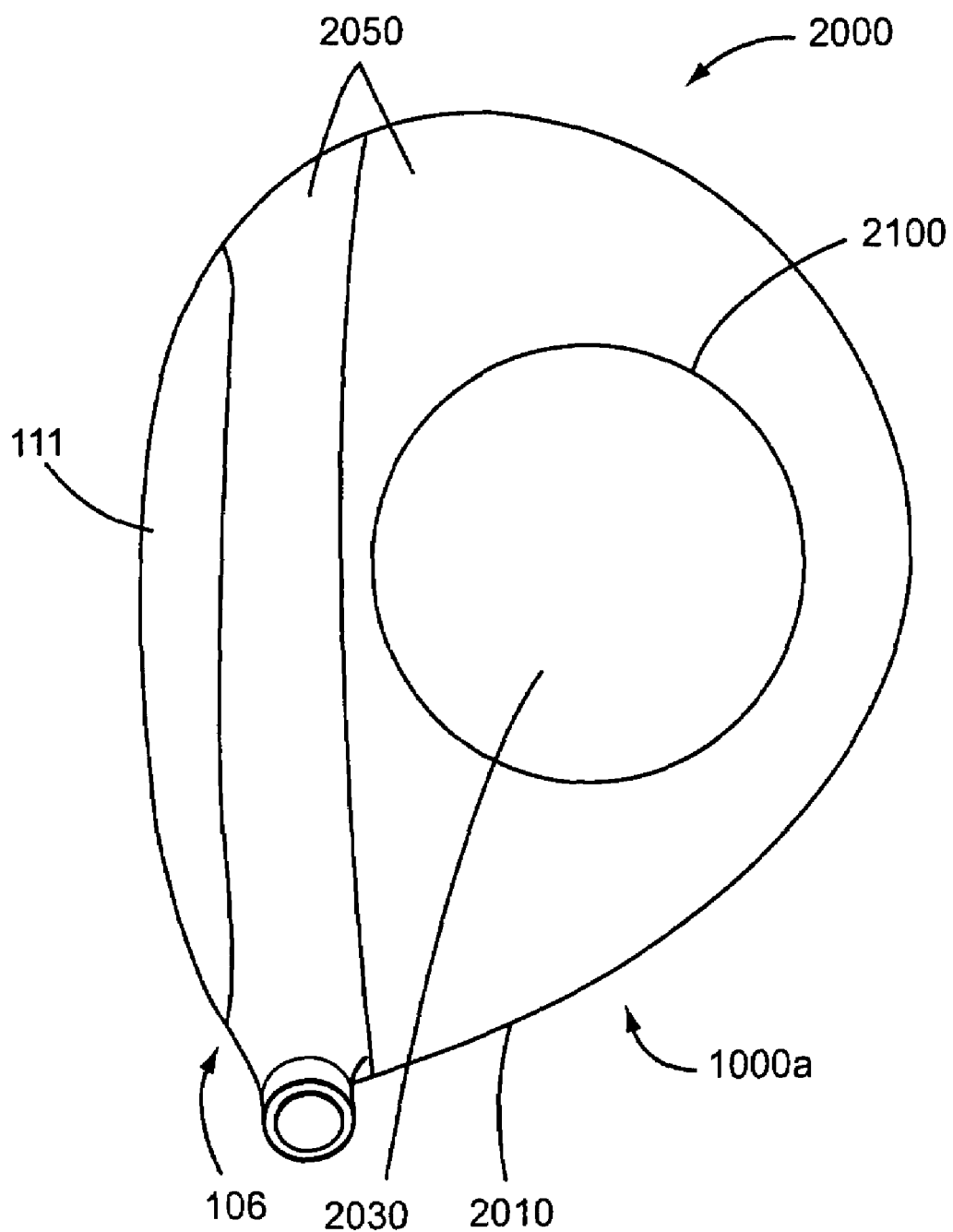
FIG. 19B is a top plan view of the golf club head of FIG. 19A.

Referring to FIG. 19B, the term "top portion", e.g., the top portion 2050, as used herein, denotes the portion of the club head, excluding the striking surface 111, visible in a top plan view with the club head 2000 in the reference position.

Figure 19C:
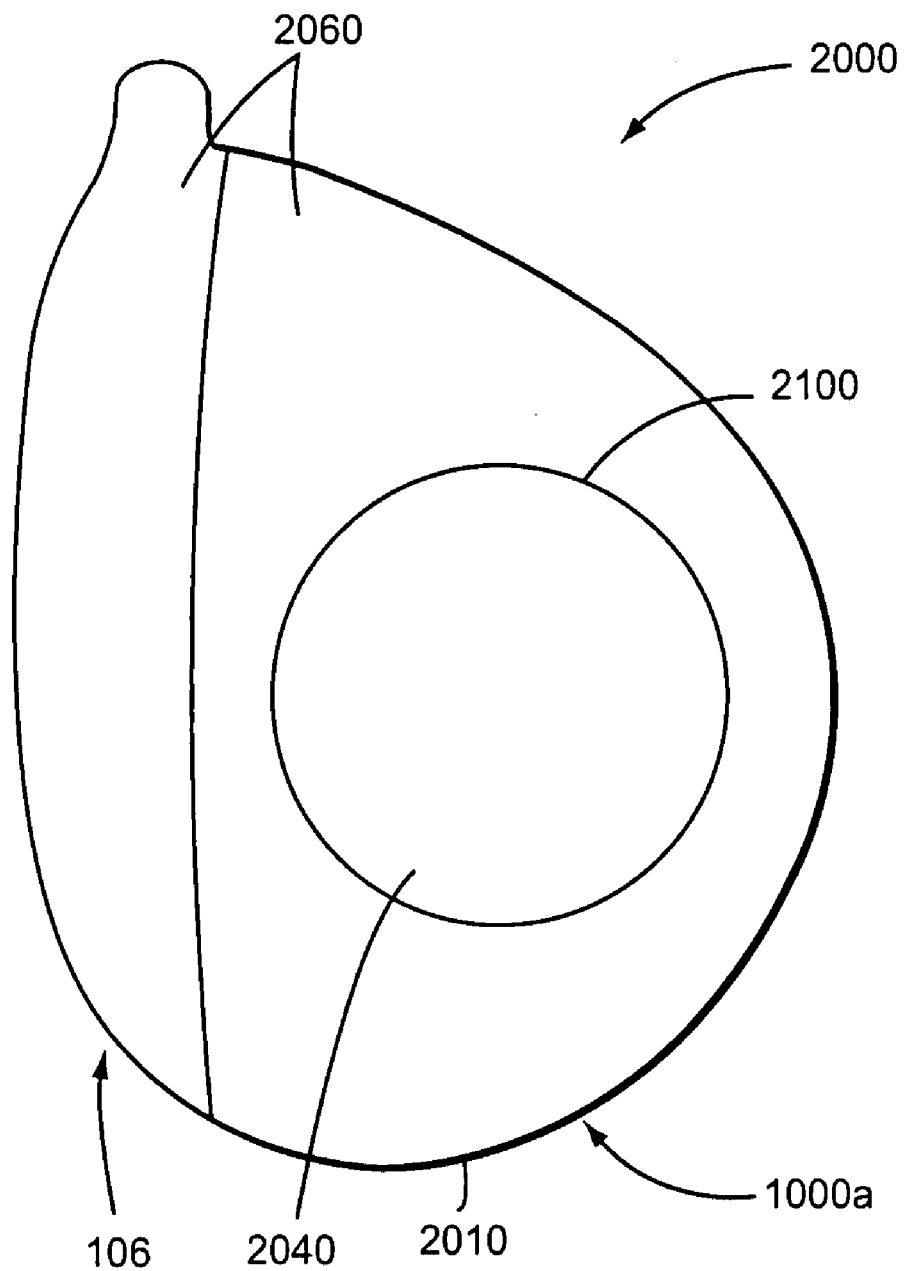
FIG. 19C is a bottom plan view of the golf club head of FIG. 19A.
Figure 19D:
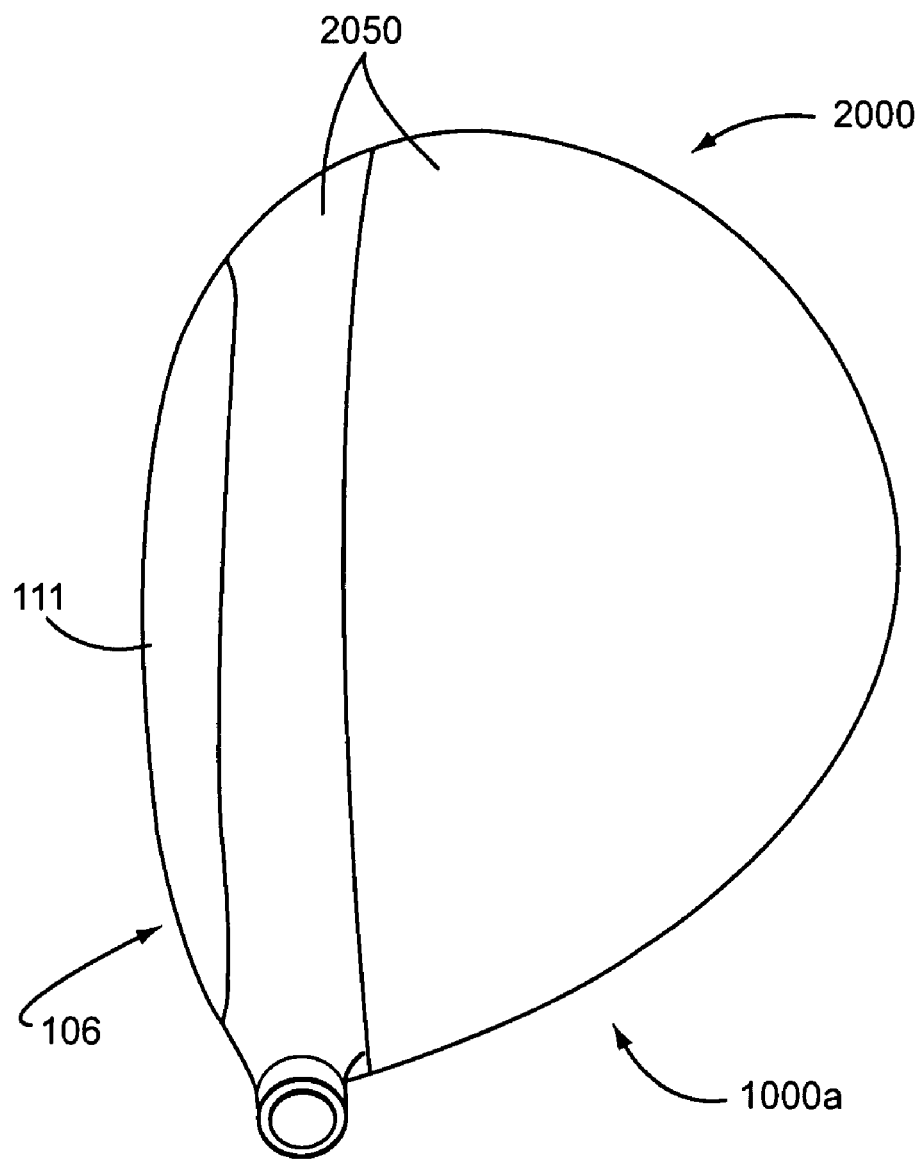
FIG. 19D is a top plan view of a golf club head in accordance with one or more embodiments of the present invention.
Figure 19E:
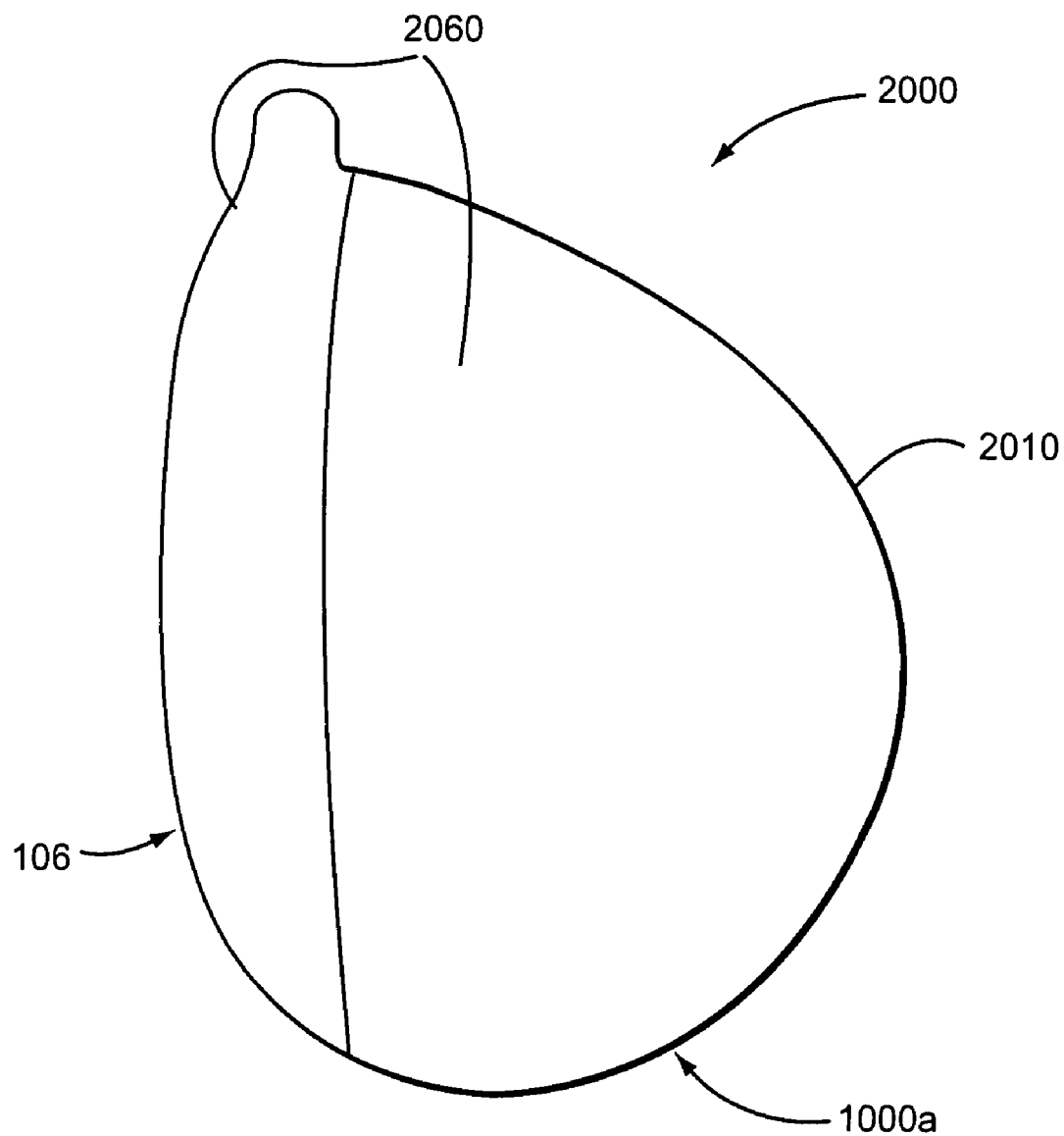
FIG. 19E is a bottom plan view of the golf club head of FIG. 19D.

Referring to FIG. 19C, the term "bottom portion", e.g., the bottom portion 2060, as used herein, denotes the portion of the club head visible in a bottom plan view with the club head 2000 in the reference position.

Figure 11A:
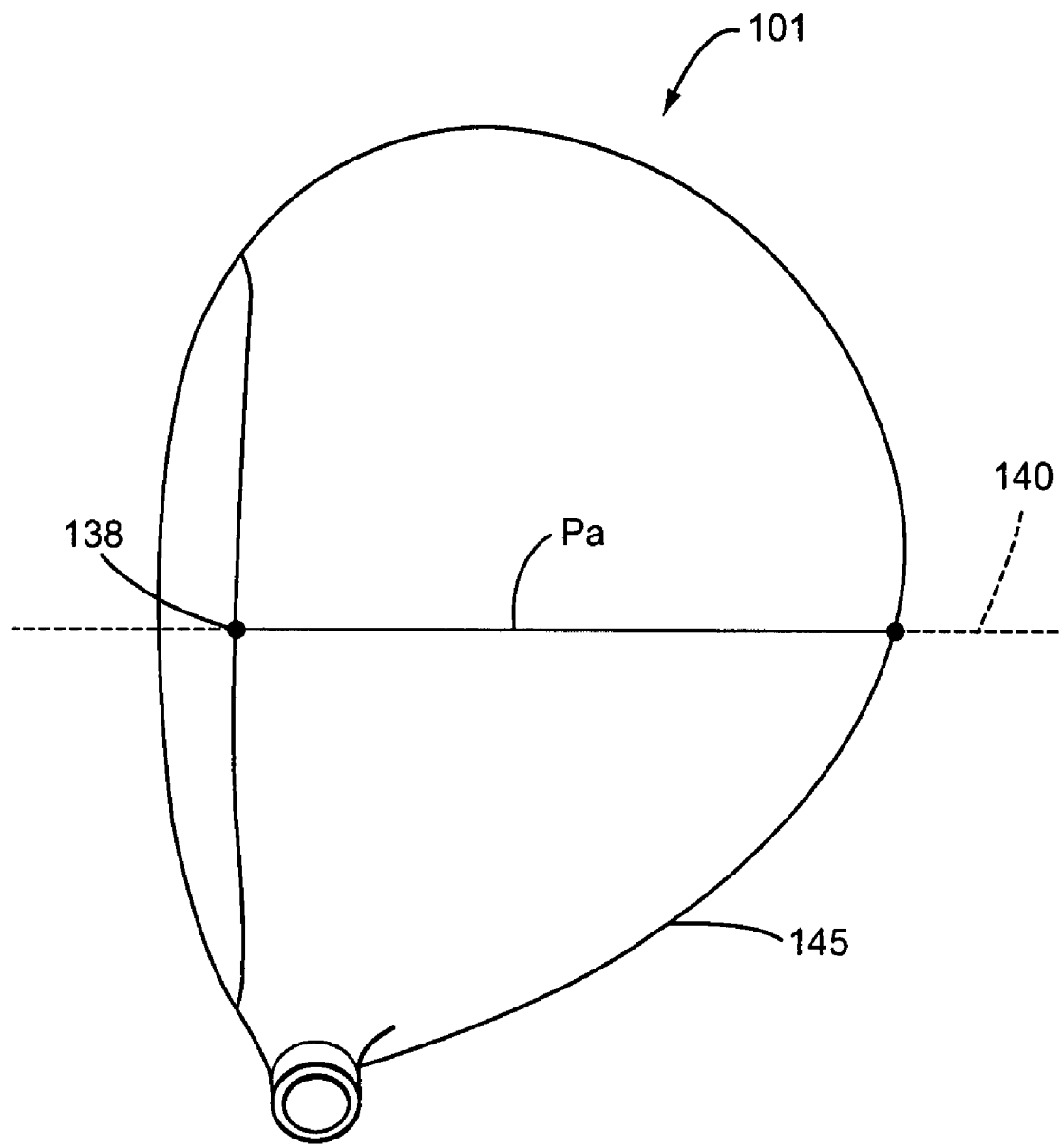
FIG. 11A is a top plan view of the golf the golf club head of FIG. 1.
Figure 11B:
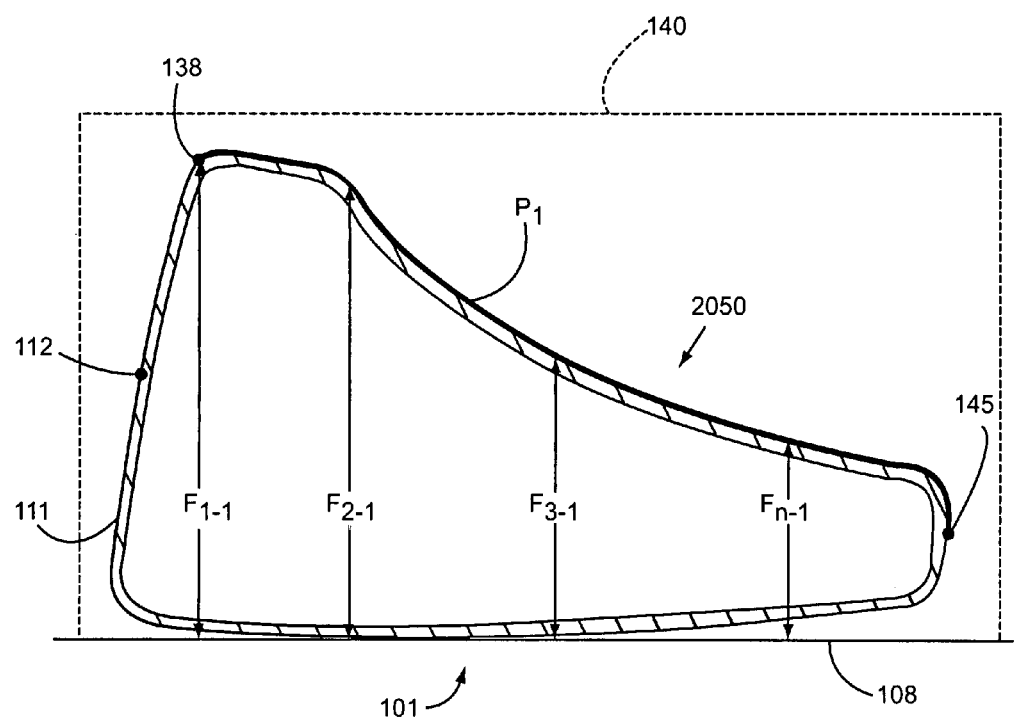
FIG. 11B is a cross-sectional view of a golf club head in accordance with one or more aspects of the present invention.
Figure 11C:
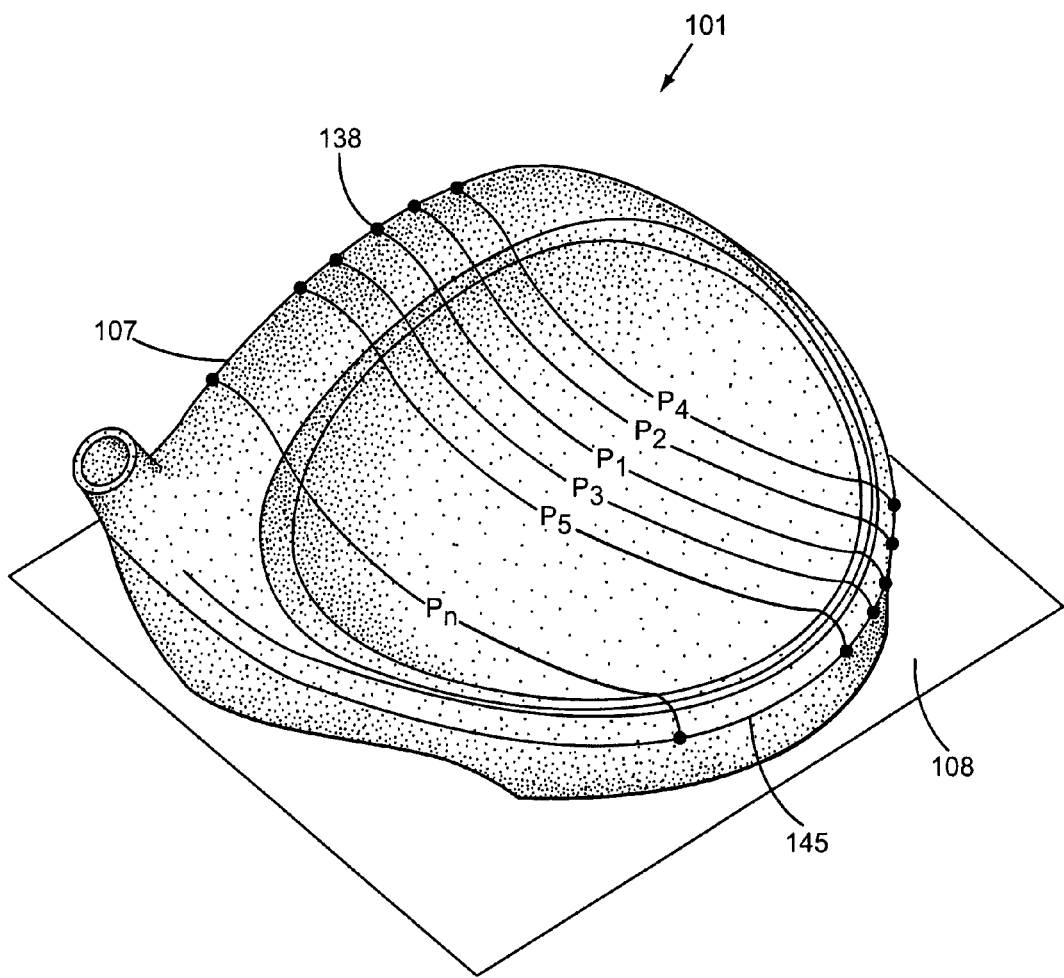
FIG. 11C is a rear perspective view of the golf club head of FIG. 11B.

Referring to FIGS. 11A-11C, "average height", as used herein, denotes an average of a plurality of vertical distances, $F_1 \ldots F_n$, between one or more of a plurality of reference paths $P_1 \ldots P_n$ (FIG. 11C) and the ground plane 108, with the club head 101 in the reference position. For example, as shown in FIG. 11B, reference path $P_1$ is characterized by the intersection of an imaginary vertical plane 140 and a top portion 2050 of an exemplary club head 101. The imaginary vertical plane 140 is oriented substantially perpendicular to the striking surface 111 and passes through the face center 112. Referring to FIG. 11A, the reference path $P_1$ is bounded by the center apex 138 and the intersection of the vertical plane 140 with a peripheral edge 145. The peripheral edge 145 comprises the perimetric boundary of the club head in a top plan view.

As shown in FIG. 11C, other reference paths, e.g., paths $P_2$, $P_3$, $P_4$, and $P_5$, may be laterally spaced from the reference path $P_1$, e.g., in increments of one centimeter. Such reference paths are characterized by intersections of imaginary vertical planes (not shown), parallel to the reference path $P_1$, with the top portion 2050 of the club head 101 and are bounded by the top edge 107 and the peripheral edge 145. Vertical distances $F_1 \ldots F_n$ are measured along any one of the plurality of reference paths $P_1 \ldots P_n$ in evenly spaced horizontal increments of, e.g., one centimeter, originating at the top edge 107 and terminating at a location along the path nearest the peripheral edge 145.

Figure 12A:
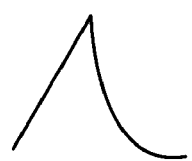
FIGS. 12A-12F illustrate a plurality non-arcuate junctions in accordance with one or more aspects of the present invention.
Figure 12B:
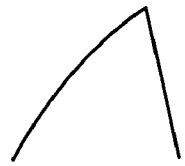
Figure 12C:
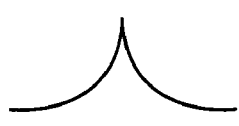
Figure 12D:
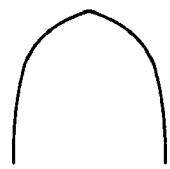
Figure 12E:
Figure 12F:

The term "non-arcuate junction," as used herein, refers to a junction of two lines where an arcuate line intersects a straight line (FIGS. 12A and 12B), an arcuate line intersects another arcuate line (FIGS. 12C, 12D, and 12E), or a straight line intersects another straight line (FIG. 12F).

Figure 13A:
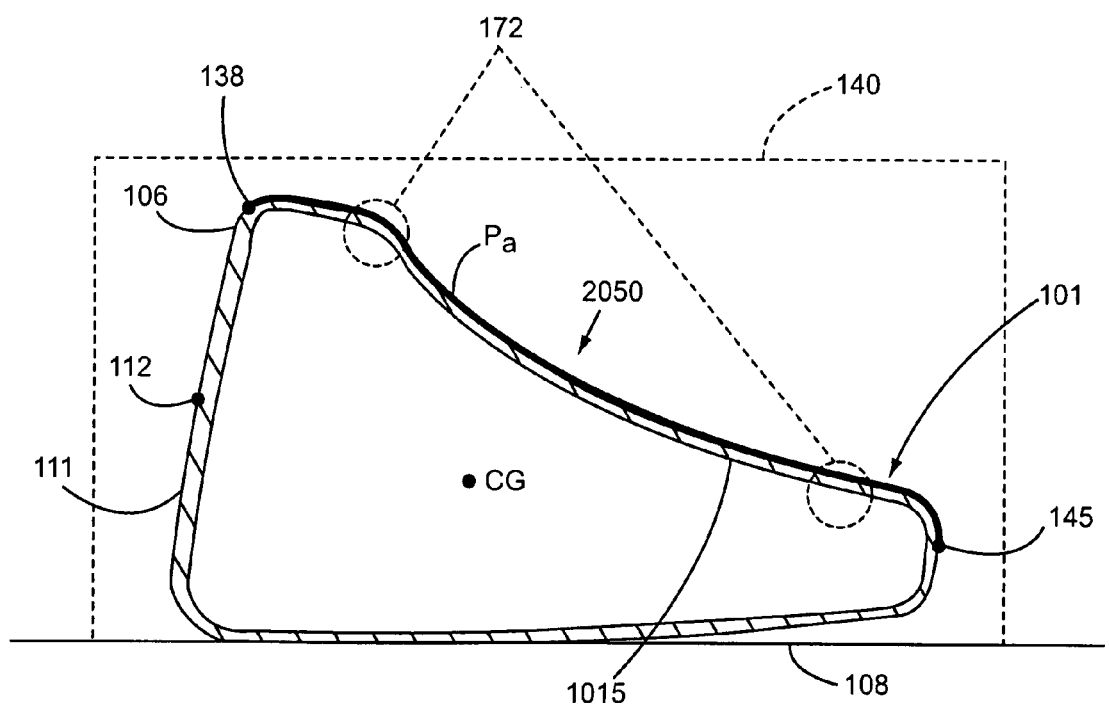
FIG. 13A is a cross-sectional view of the golf club head of FIG. 11B.
Figure 13B:
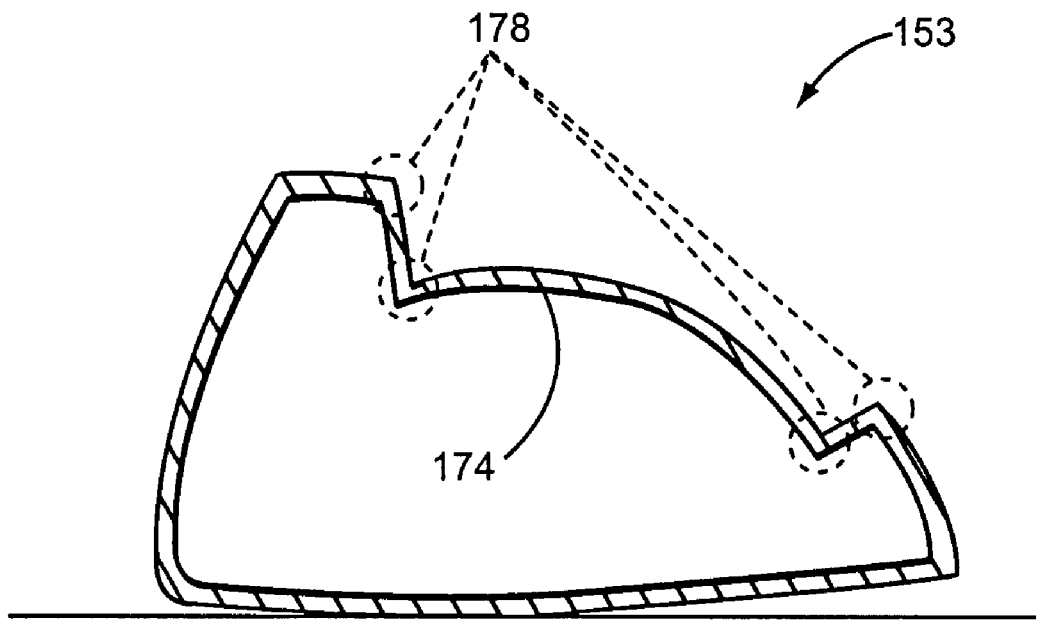
FIG. 13B is a cross-sectional view of a golf club head according to one or more aspects of the present invention.
Figure 13C:
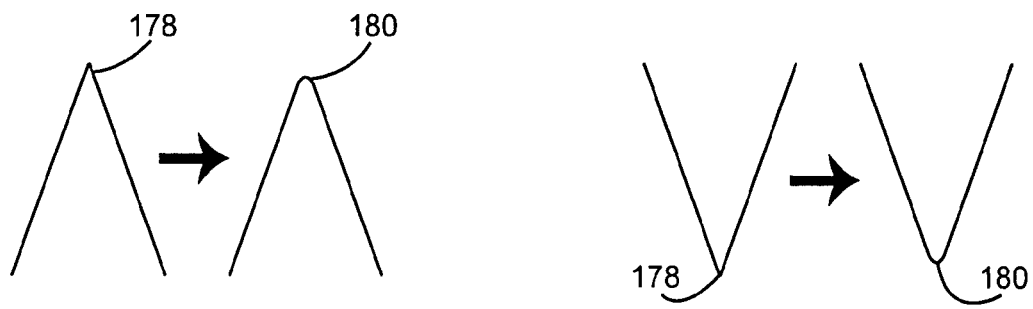
FIG. 13C illustrates an example of a non-arcuate junction.
Figure 13D:
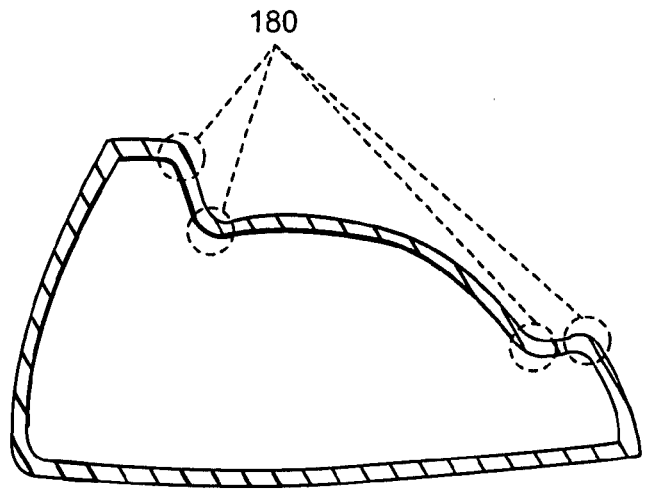
FIG. 13D is a cross-sectional view of the golf club head of FIG. 13B

Referring to FIG. 13A, "articulation point", e.g., the articulation point 172, as used herein, denotes at least one point along one or more of the plurality of reference paths $P_1 \ldots P_n$, described above with reference to FIG. 11C, where the curvature changes from concave to convex or vice versa. When determining whether one of a plurality of reference paths $P_1 \ldots P_n$ changes curvature, it is assumed that all non-arcuate junctions along each reference path are arcuate. For example, each non-arcuate junction 178 of club head 153, illustrated in FIG. 13B, is substituted with an imaginary junction 180, having an infinitesimally small radius, as shown in FIGS. 13C and 13D.

The term "discretionary mass", as used herein, denotes the difference between a target mass of the club head and a minimum structural mass required to form the club head.

The term "volume", as used herein, denotes the volume determined using the method described in the Procedure for Measuring the Club Head Size of Wood Clubs, Revision 1.0, Section 5 (Nov. 21, 2003), as administered by the United States Golf Association (USGA) and the R&A Rules Limited (R&A). As described in the Procedure for Measuring the Club Head Size of Wood Clubs, the "volume" is determined by using the following methodology:

1) Water is placed in a container large enough to completely immerse a club head without the club head touching the container;
2) The filled container is placed on a digital electronic scale that is then tarred;
3) The club head is slowly lowered into the container until the top of the club head is just below the surface of the water. The hosel of the club head should not be submerged.
4) The reading on the electronic scale with the club head submerged as described in step 3, above, is equal to the actual volume of the club head in cubic centimeters.

Figure 14:
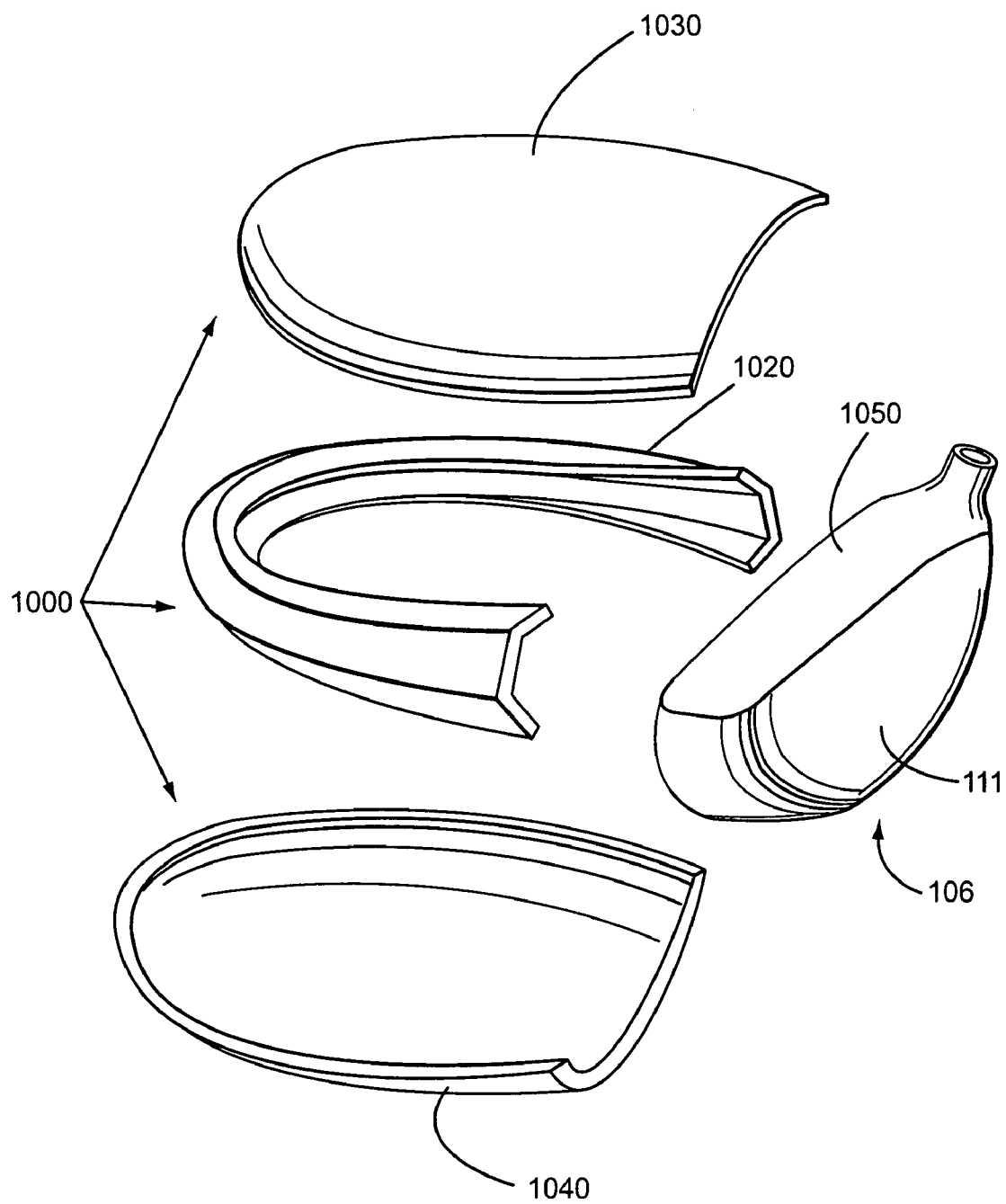
FIG. 14 is an exploded view of a golf club head according to one or more aspects of the present invention.
Figure 15:
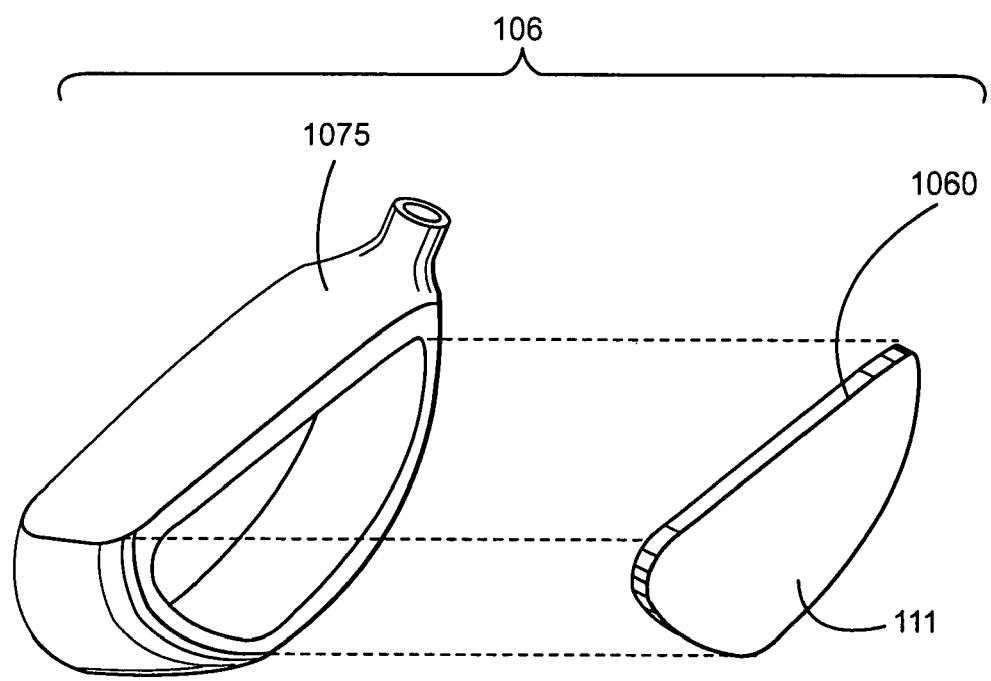
FIG. 15 is an exploded view of a face portion of FIG. 14

With reference to FIGS. 14 and 15, a wood-type club head according to one or more aspects of the invention may have a face portion 106 and a body portion 1000. The body portion 1000 may incorporate three separate elements, which may include a upper cover 1030, an intermediate portion 1020, and a lower cover 1040. The upper cover 1030 and/or the lower cover 1040 may comprise a non-metallic material, such as a thermoset, a thermoplastic, or a composite material. To increase the available discretionary mass, the non-metallic portions of the club head preferably comprise at least about 30% of the head's total material volume, more preferably at least about 20% of the head's total mass, and most preferably at least about 8% of the head's total mass. Generally, the total mass of a wood-type club head according to one or more aspects of the present invention is between about 150 g and about 250 g. The increased discretionary mass may be redistributed in the club head to improve the inertial properties of the club head and/or the location of the center of gravity.

Figure 16A:
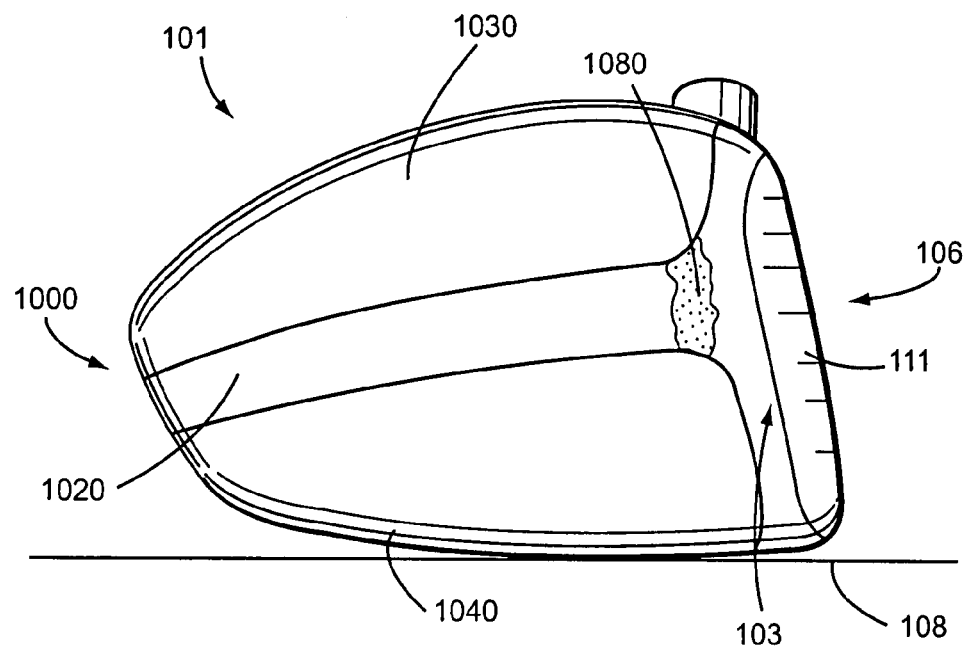
FIG. 16A is a toe-side elevational view of the golf club head of FIG. 14.
Figure 16B:
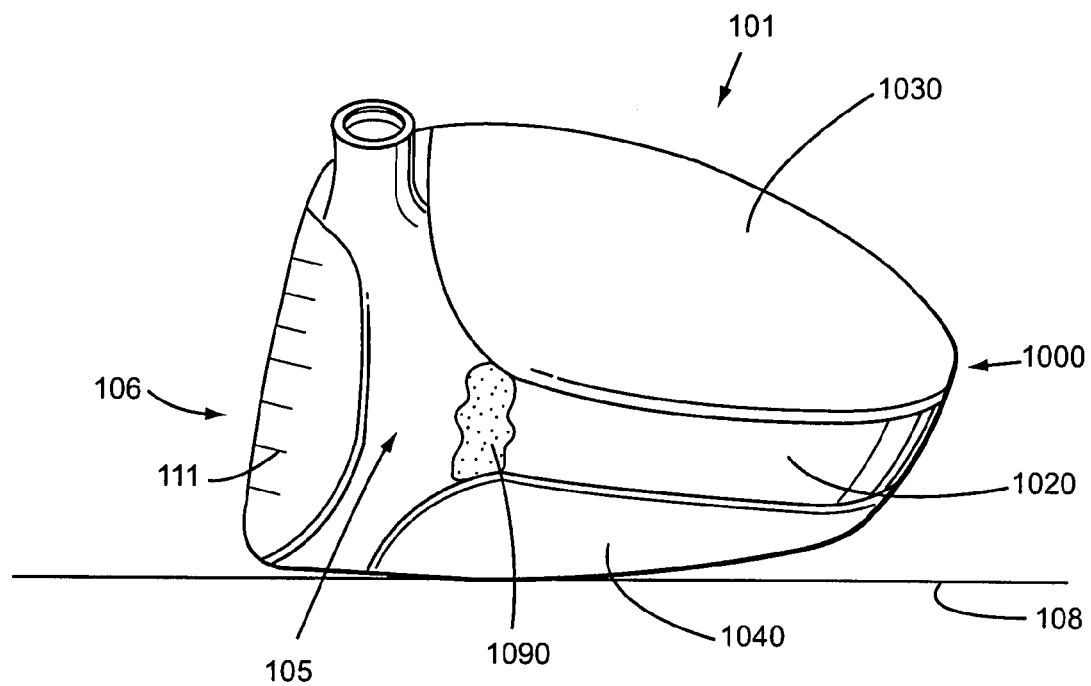
FIG. 16B is a heel-side elevational view of the golf club head of FIG. 14.

The intermediate portion 1020 may comprise a metallic material to improve the structural integrity and/or the inertial properties of the club head. As shown in FIGS. 16A and 16B, the intermediate portion 1020 may separate the upper cover 1030 from the lower cover 1040. The components of the body portion 1000 may be joined by any suitable means, e.g., an adhesive bonding material.

The club head in accordance with one or more aspects of the present invention utilizes a favorable average height, determined as defined above. More specifically, decreasing the average height relative to that of a conventional driver may require less material to form, e.g., the upper cover portion 1030, thus increasing available discretionary mass. The average height between at least one of the plurality of reference paths $P_1 \ldots P_n$ (FIG. 11C) and the ground plane 108 maybe, e.g., between about 20 mm and about 45 mm, between about 35 mm and about 45 mm, between about 36 mm and about 41 mm, between about 37 mm and about 40 mm, between about 15 mm and about 30 mm, or between about 15 mm and about 40 mm. The increased discretionary mass created by utilizing the exemplary average heights, recited above, may be redistributed in the club head according to one or more aspects of the invention to improve the mass properties thereof.

Moreover, an increase in available discretionary mass may be achieved by providing at least one articulation point 172 (FIG. 13A) along one or more of the plurality of reference paths $P_1 \ldots P_n$ on the top portion 2050 of the club head (FIG. 11C). By utilizing a favorable number of articulation points 172, a crown shape conducive to a beneficial weight distribution may be achieved. For example, as illustrated in FIG. 13A, a concavity 1015 may be formed in the top portion 2050 of the club head 101 by providing, e.g., two articulation points 172. Such club head construction allows the mass to be redistributed from the top portion of the club head to a more favorable location in the head. Accordingly, mass may be redistributed, e.g., to improve the inertial properties of the club head and/or the location of the center of gravity CG. This may allow for a more forgiving club head and result in improved shot accuracy and distance.

According to one or more aspects of the present invention, the center of gravity of the club head may be more favorably positioned as the additional discretionary mass, obtained, e.g., by utilizing localized non-metallic components, a favorable average height, and/or one or more articulation points, is placed as low and deep as possible in the exemplary club head 101. The additional discretionary mass obtained as disclosed above may take the form of one or more weight elements or pads that may have a combined weight between, e.g., about 5 g and about 80 g.

Figure 10A:
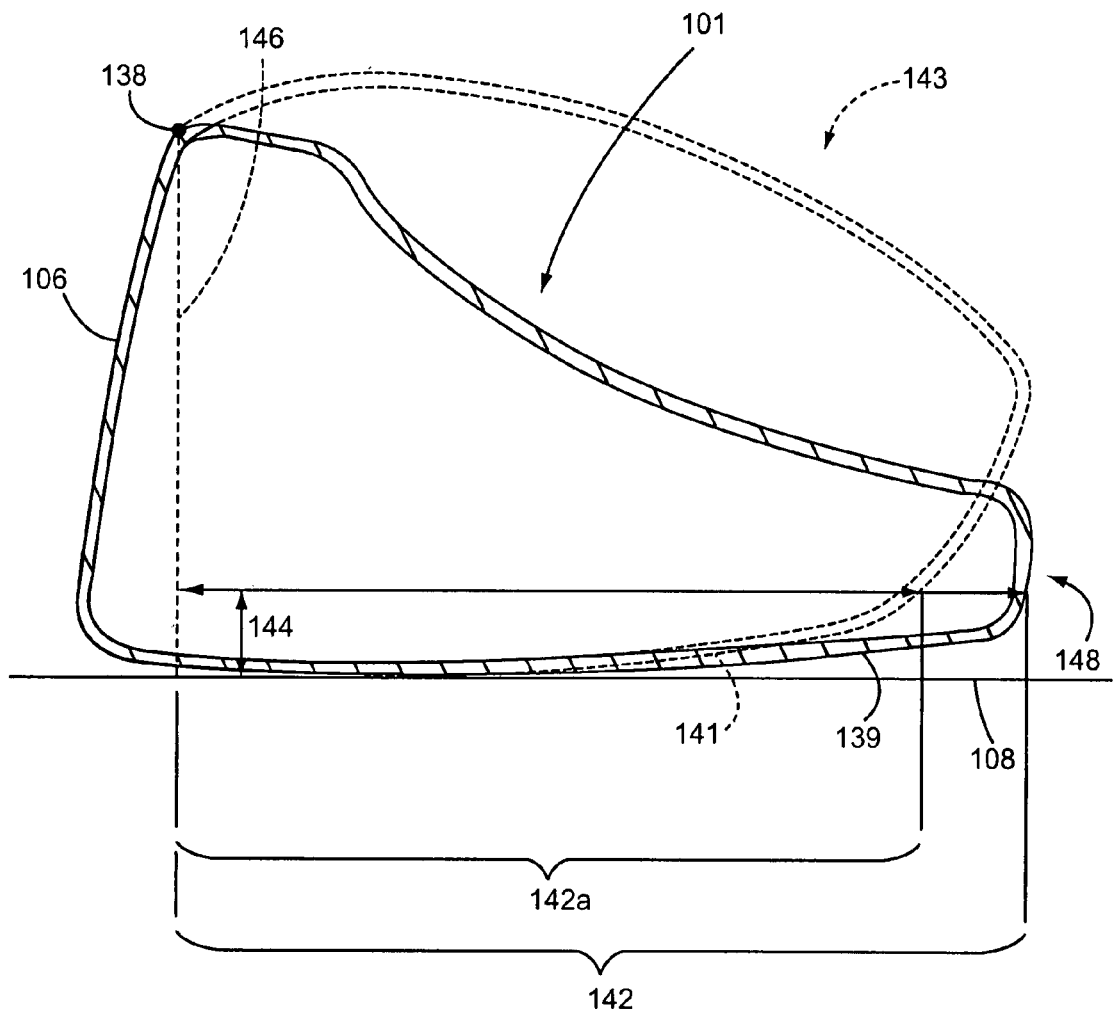
FIG. 10A is a cross-sectional view of the golf club in accordance with one or more aspects of the present invention superimposed over a conventional club head.

As shown in FIG. 10A, conventional club heads, e.g., a club head 143, have limited potential to carry discretionary mass low and deep in the chassis, partially because their soles, e.g., sole 141, are generally elevated with respect to the ground plane 108. Referring once again to FIG. 10A, a golf club head 101, according to one or more aspects of the invention, comprises a sole 139, configured with the break length 142, which is elongated compared to a corresponding break length 142a of the conventional club head 143, having a similar volume. The novel configuration of the sole 139, as evidenced by the increased break length 142, permits lower and deeper placement of discretionary mass in the inventive club head 101, in its various exemplars, compared to conventional club heads, e.g., club head 143.

Accordingly, the club head 101 may have a break length 142 between about 50 mm and about 110 mm at the vertical distance 144 between about 1 mm and about 15 mm relative to the ground plane 108. Preferably, the break length 142 may be between about 90 mm and about 150 mm, more preferably between about 96 mm and about 140 mm, even more preferably between about 100 mm and about 140 mm, even more preferably between about 110 mm and about 140 mm, and most preferably between about 120 mm and about 140 mm. at the vertical distance 144 between about 5 mm and about 10 mm relative to the ground plane 108. The break length 142, in accordance with the one or more aspects of the present invention, allows discretionary mass to be placed low and deep within the club head 143, delivering an improved location of the center of gravity.

Figure 4A:
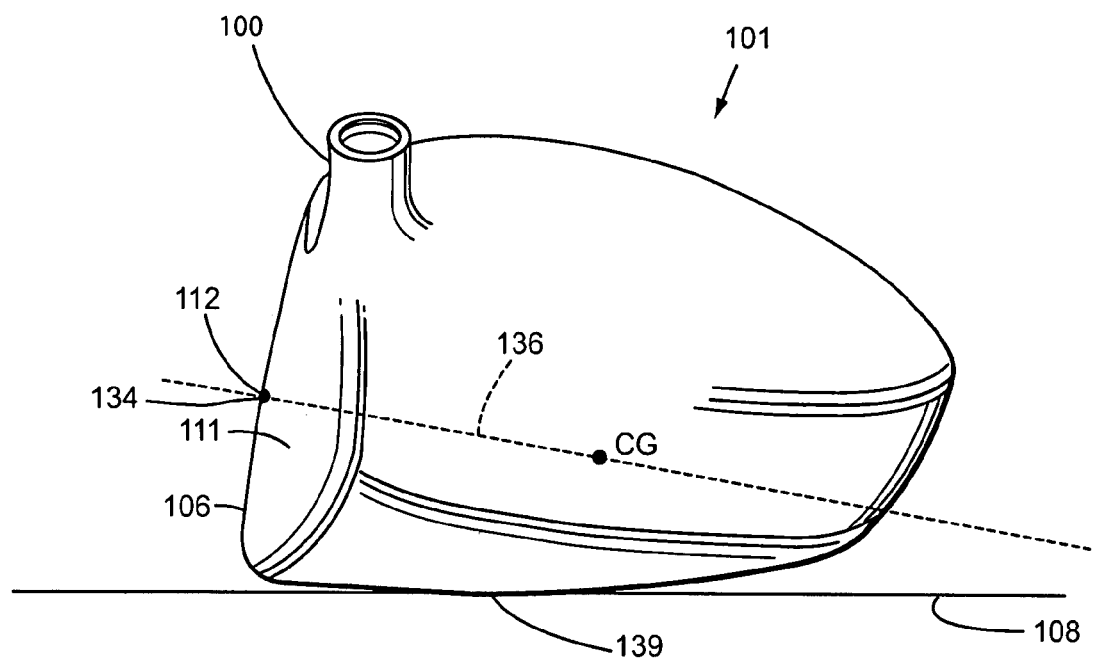
FIG. 4A is a heel side elevational view of the golf club head of FIG. 1.

As shown in FIG. 4A, the increased break length, associated with configuring the sole 139 according to one or more aspects of the present invention, may allow discretionary mass to be positioned sufficiently low in the club head 101 to substantially align the sweet spot 134 with the COR "hot spot", i.e., the face center 112. By lowering the center of gravity CG and aligning the sweet spot 134 with the COR "hot spot" 112, the benefits of two performance variables, i.e., the increased shot distance associated with the COR "hot spot" 112 and the increased accuracy associated with the "sweet spot" 134, may be realized simultaneously.

The increased break length associated with configuring the sole 139 in accordance with one or more aspects of the invention may also allow the center of gravity to be positioned deeper in the club head. Referring to FIG. 3A, the depth of the center of gravity is the shortest horizontal distance, e.g., the distance 124, between the center of gravity CG and the vertical plane 126, containing the hosel center 122. Increasing the depth of the center of gravity CG enhances dynamic flexing of the shaft toward alignment with the center of gravity to loft the head and to close the face preferably "square" at impact with the ball. Hence, ball-launch conditions and shot accuracy may be improved.

As shown in FIGS. 3A and 3B, the location of the center of gravity CG of the club head 101 may be further described with reference to the second horizontal distance 128 and the first vertical distance 132, as defined above. In one or more aspects of the present invention, the first horizontal distance 124 may preferably be between about 12 mm and about 38 mm, more preferably between about 15 mm and about 36 mm, and most preferably between about 25 mm and about 35 mm. The second horizontal distance 128 may preferably be between about 40 mm and about 78 mm, more preferably between about 50 mm and about 70 mm, and most preferably between about 55 mm and about 66 mm. The first vertical distance 132 may preferably be between about 10 mm and about 30 mm, more preferably between about 10 mm and about 25 mm, more preferably between about 10 mm and about 20 mm, and most preferably between about 10 mm and about 15 mm.

In addition to improving the location of the center of gravity, favorable placement of discretionary mass throughout the club head may increase the primary heel-toe MOI and the primary high-low MOI and may ultimately improve performance on off-center hits by reducing slice/hook tendencies. In accordance with one or more aspects of the present invention, the primary high-low MOI may preferably be at least about 2500 g·cm$^2$ and more preferably at least about 3000 g·cm$^2$. The primary heel-toe MOI may preferably be at least about 3500 g·cm$^2$, more preferably at least about 4000 g·cm$^2$, and most preferably at least about 4500 g·cm$^2$.

Referring to FIGS. 5 and 6, a quantity of available discretionary mass may also be utilized in the face portion 106 to make the striking surface 111 taller and wider. The large striking surface provides the golfer with increased confidence, resulting in elevated club head speeds and increased ball carry distances. In accordance with one or more aspects of the present invention, the face height 154 may preferably be between about 35 mm and about 70 mm, more preferably between about 45 mm and about 58 mm, and most preferably between about 48 mm and about 56 mm. The face length 164 may preferably be between about 94 mm and about 115 mm, more preferably between about 96 mm and about 112 mm, and most preferably between about 98 mm and about 110 mm.

The face portion 106, illustrated in FIGS. 14 and 15, may comprise a cup portion 1050 or a strike plate 1060 and an annular portion 1075, attached to the body portion 1000, for example, by welding, adhesive bonding, brazing, or other suitable means. Typically, face portion 106 and the intermediate portion 1020 are composed of the same material; however, dissimilar materials may be utilized. For example, the intermediate portion 1020 may comprise a first metallic material, the strike plate 1060 may comprise a second metallic material, and the annular portion 1075 may comprise a third metallic material. In some examples, the density of the third metallic material may be greater than the density of the second metallic material and the density of the second metallic material may be greater than the density of the first metallic material. Various combinations of materials may result in a club head having improved performance, cost, and/or aesthetic appeal.

Figure 17:
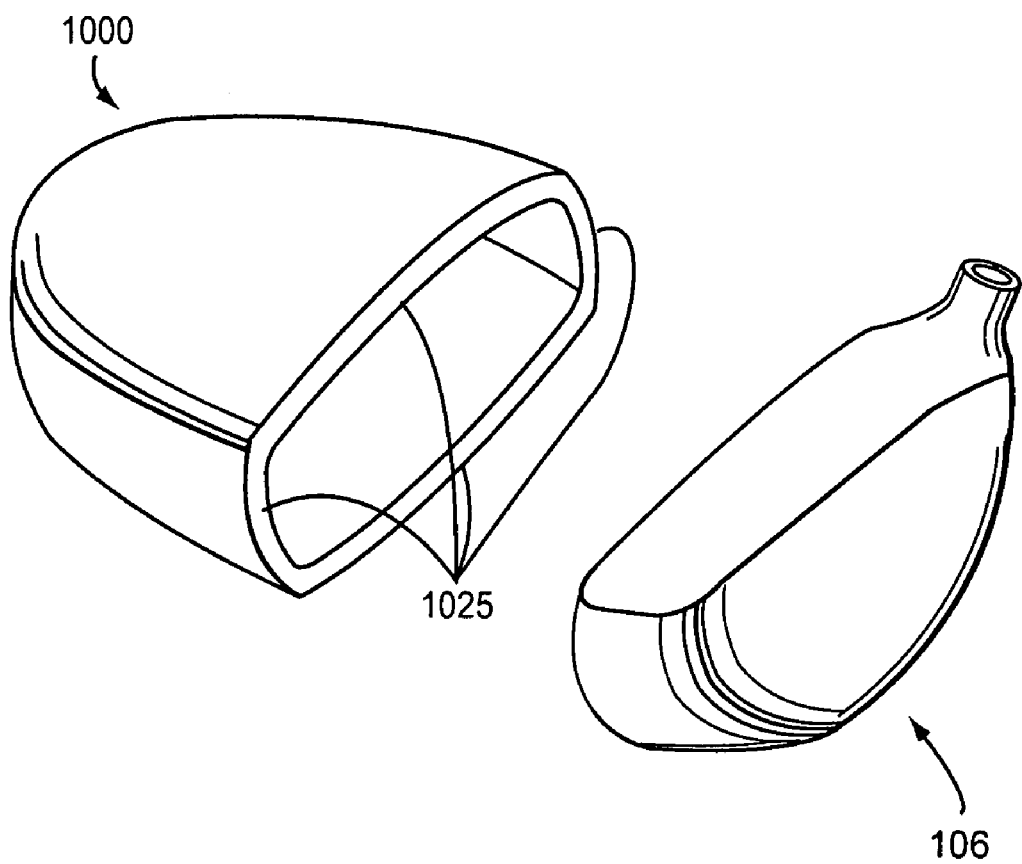
FIG. 17 is an exploded view of the golf club head of FIG. 14.

As shown in FIGS. 16A and 16B, the face portion 106, according to one or more aspects of the invention, may be coupled to the intermediate portion 1020 by two discrete welds, i.e., a first weld 1080, located about the toe 103 of the club head 101, and a second weld 1090, located about the heel 105. As illustrated in FIG. 17, each weld may lie in a peripheral attachment zone 1025, characterized by the junction between the face portion 106 and the body portion 1000. The attachment zone 1025 may be substantially planar or non-planar, i.e., substantially two-dimensional or three-dimensional. The length of the welds 1080 and 1090 in the peripheral attachment zone 1025 may be minimized to reduce negative effects, e.g., distortion, associated with high-temperature joining operations, such as welding. Preferably, welds 1080 and 1090 comprise between about 1% and about 40% of the perimetric length of the peripheral attachment zone 1025. More preferably, welds 1080 and 1090 comprise between about 1% and about 30% of the perimetric length of the peripheral attachment zone 1025. Even more preferably, welds 1080 and 1090 comprise between about 1% and about 20% of the perimetric length of the peripheral attachment zone 1025. Most Preferably, the welds 1080 and 1090 comprise between about 1% and about 10% of the perimetric length of the peripheral attachment zone 1025.

Each weld in the peripheral attachment zone 1025 may comprise one of a number of various welding-joint configurations, including, e.g., a butt joint, a lap joint, or a corner joint. Prior to welding each joint, tack welds or clamping fixtures may be used to hold the parts to be joined in proper alignment.

Figure 18A:
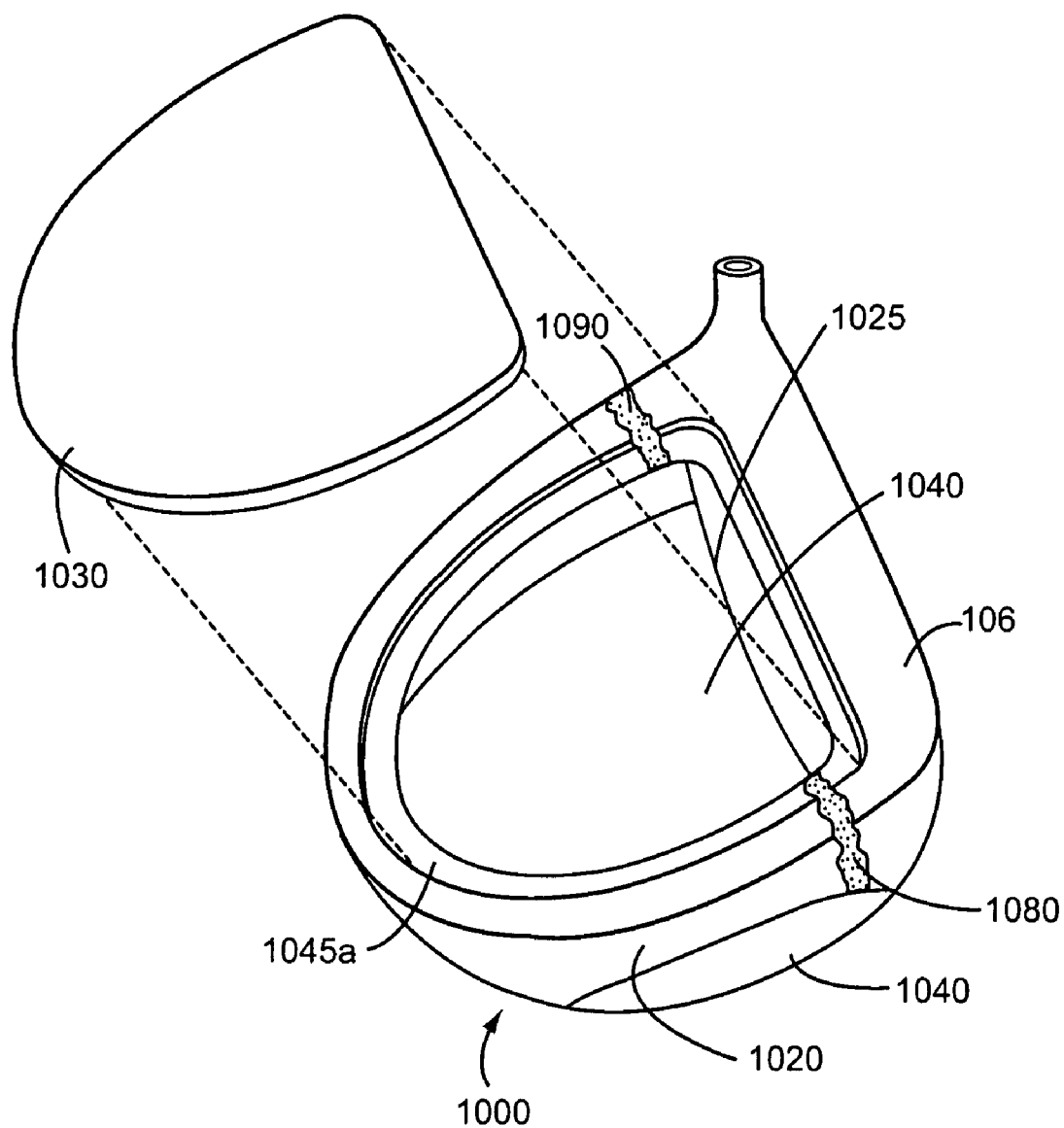
FIG. 18A is a partially exploded view of the golf club head of FIG. 14.
Figure 18B:
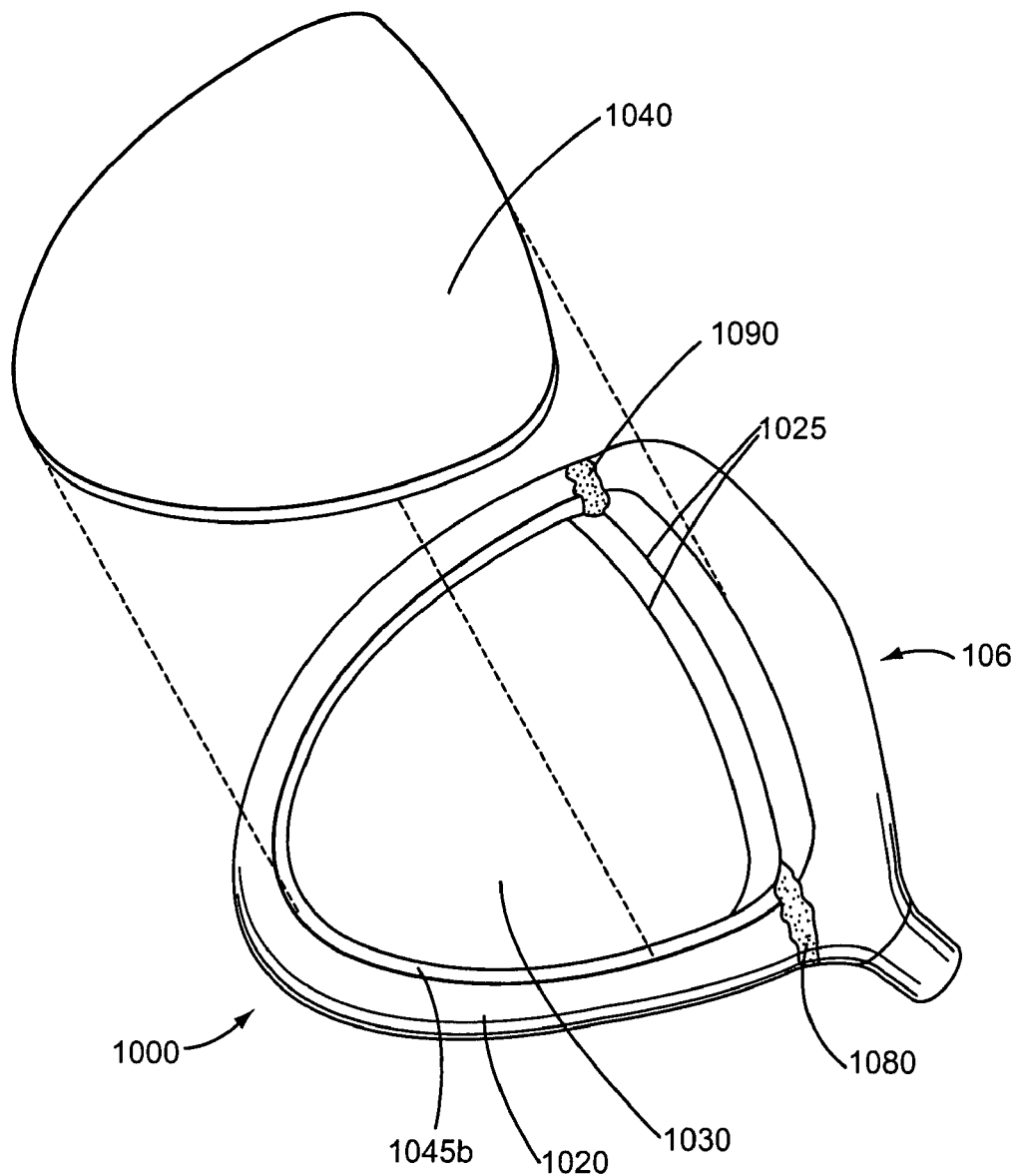
FIG. 18B is a partially exploded view of the golf club head of FIG. 14.

Referring to FIGS. 18A and 18B, the remaining components of the body portion, i.e., the upper cover 1030 and the lower cover 1040, may be joined to the assembly comprising the intermediate portion 1020 and the face portion 106 via, e.g., an adhesive bonding material. Support ledges 1045a and 1045may be provided in the intermediate portion 1020 and the face portion 106 for attaching the upper cover 1030 and the lower cover 1040 thereto. Recessing support ledges 1045a and 1045allows the upper cover 1030 and/or the lower cover 1040 to be disposed substantially flush with the rest of the club head. The finished club head may have both the overall length 182 (FIG. 8) and the overall width 190 (FIG. 9) greater than about 75 mm. The volume of the club head according to one or more aspects of the invention may be less than about 480 cm$^3$, preferably less than about 400 cm$^3$, more preferably less than about 390 cm$^3$, and most preferably less than about 380 cm$^3$.

Referring to FIGS. 19A-19E, a golf club head 2000, according to one or more aspects of the invention, may include the face portion 106 and a body portion 1000a. To increase the discretionary mass of the head, the body portion 1000a may include a light-weight component 2100, having an upper element 2030, a lower element 2040, and, optionally, at least one connecting member, e.g., the connecting member 2070, extending between the upper element 2030 and the lower element 2040. In another example, the light-weight component 2100 may comprise only the upper element 2030 and at least one connecting member, e.g., the connecting member 2070, extending between the upper element 2030 and the bottom portion 2060 (FIG. 19E) of the club head. In yet another example, the light-weight component 2100 may comprise only the lower element 2040 and at least one connecting member, e.g., the connecting member 2070, extending between the lower element 2040 and the top portion 2050 (FIG. 19D) of the club head. The light-weight component 2100 may comprise metallic materials, e.g., titanium, magnesium, aluminum and/or stainless steel, and/or non-metallic materials, e.g., thermoplastics, thermosets, and/or composites.

Referring to FIG. 19A, the body portion 1000a also includes a support shell 2010 that may be coupled to the light-weight component 2100 by any suitable means, e.g., adhesive bonding, welding, or brazing. As shown in FIGS. 19B and 19C, the light-weight component 2100 may be, at least in part, bounded by the support shell 2010. To improve the inertial properties of the club head 2000, the exemplary support shell 2010 may be constructed from a material having a greater density than that of the light-weight component 2100. Such construction may improve shot accuracy and carry distance on off-center hits. The support shell 2010 may comprise metallic and/or non-metallic materials.

Figure 20:
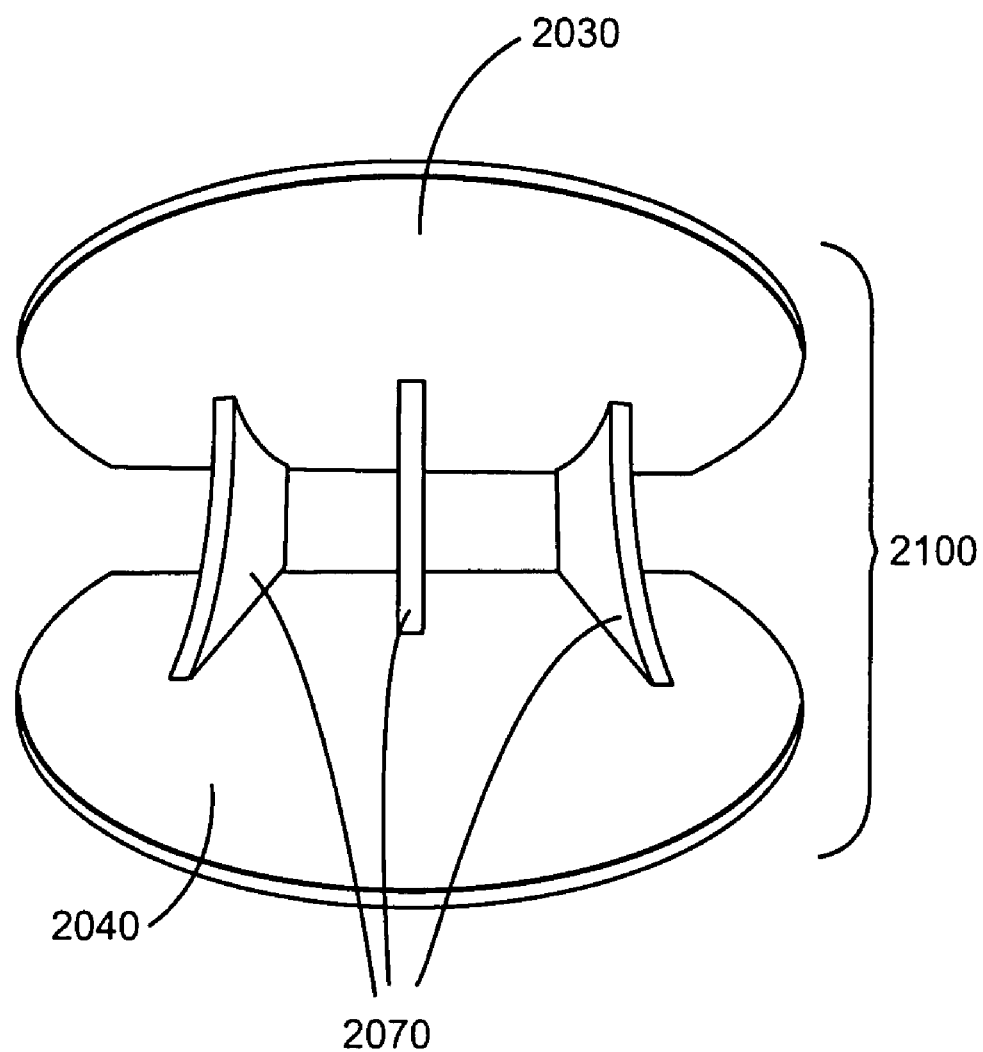
FIG. 20 is an illustration of the light-weight component according to one or more aspects of the present invention.

With reference to FIGS. 20, the light-weight component 2100 may include at least one connecting member, e.g., the connecting members 2070, to improve the structural integrity and/or acoustic properties of the club head 2000. In one example, connecting members 2070 may extend from the lower element 2040 to the upper element 2030. The connecting members 2070 may be substantially parallel or oblique relative to one another. Such construction of the light-weight component 2100 may improve the acoustic properties of the club head at impact with the ball by promoting favorable vibrational frequencies.

The sound produced by a golf club head at ball impact may have a significant psychological effect on the player's confidence and performance. By incorporating the connecting members 2070 into the club head, a favorable dominant resonant frequency of vibration may be achieved. The dominant resonant frequency of vibration is defined as the resonant frequency that produces the greatest sound energy. To measure the sound energy of a given resonant frequency, a time-amplitude plot, with the amplitude along the y-axis and the time along the x-axis, may be generated. The resonant frequency having the greatest area underneath the curve is the dominant resonant frequency of vibration. Generally, the first resonant frequency of vibration is the dominant resonant frequency. Preferably, the first resonant frequency of vibration is between about 2000 Hz and about 7500 Hz, more preferably between about 2500 Hz and about 6000 Hz, and most preferably between about 3000 Hz and about 5000 Hz. In some instances, the dominant resonant frequency may be the second, the third, the fourth, or the fifth resonant frequency of vibration.

The total mass of the club head 2000 may be between about 150 g and about 250 g. Preferably, the light-weight component 2100 comprises at least about 20% of the total mass of the club head 2000, more preferably at least about 30% of the total mass of the club head 2000, and most preferably at least about 40% of the total mass of the club head 2000.

Figure 21:
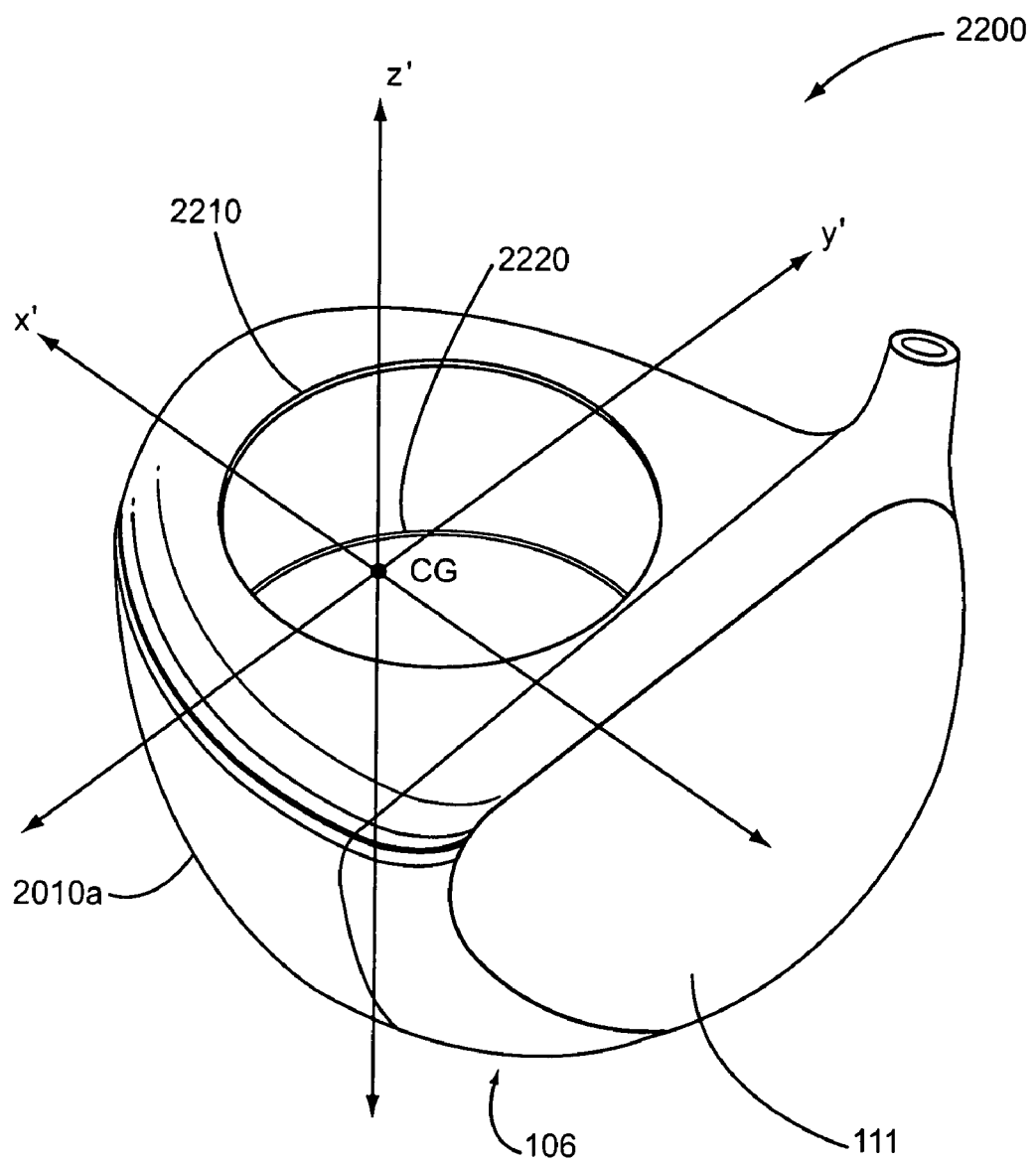
FIG. 21 is a perspective of club head component according to one or more aspects of the present invention.

Referring to FIG. 21, a golf club head in accordance with one or more aspects of the present invention, may include a club head component 2200 having the face portion 106 and a support shell 2010a. The support shell 2010a may comprise at least one of a top opening 2210 and a bottom opening 2220. In one example, the light-weight component (FIG. 20), in its various configurations, may be coupled to the support shell 2010a.

For purposes of determining the moment of inertia $I_{zz}$ about the z-axis and the moment of inertia $I_{yy}$ about the y-axis (i.e., the secondary heel-toe MOI and the secondary high-low MOI, respectively) of the club head component 2200, the general methodology discussed above may be used. Preferably, the secondary heel-toe and high-low moments of inertia of the club head component 2200 are between about 85% and about 99% of the corresponding primary moments of inertia of the entire club head, more preferably between about 88% and about 97% of the corresponding primary moments of inertia of the entire club head, and most preferably between about 90% and about 95% of the primary corresponding moments of inertia of the entire club head.

Figure 22A:
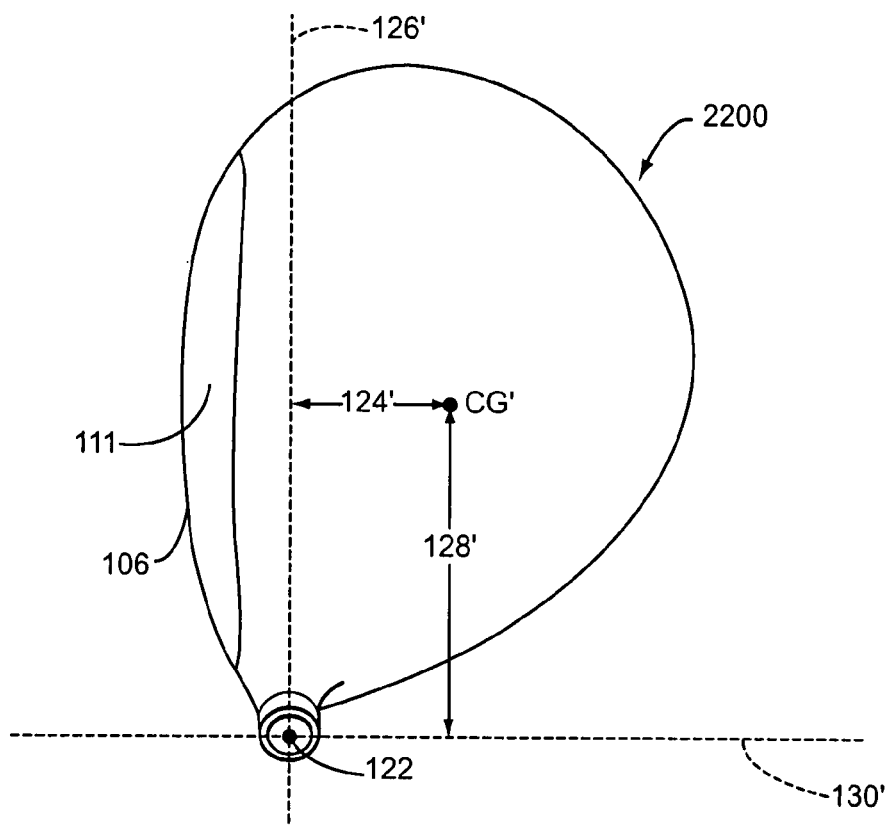
FIG. 22A is a top plan view of the club head component of FIG. 21.
Figure 22B:
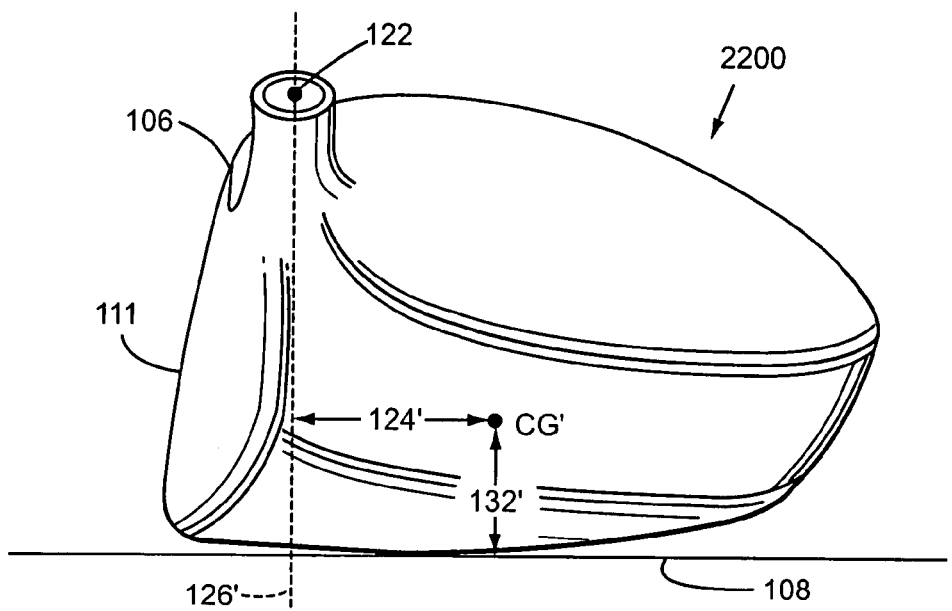
FIG. 22B is a heel side elevational view of the club head component of FIG. 21.

As shown in FIGS. 22A and 22B, the location of the center of gravity CG' of the club head component 2200 may be described as follows:

(1) Referring to FIG. 22A, the center of gravity CG' is disposed a first horizontal distance 124' from an imaginary vertical plane 126'. The plane 126' is oriented substantially parallel to the striking surface 111 and contains the hosel center 122. The distance 124' is the shortest horizontal distance from plane 126' to the center of gravity CG'.

(2) Referring to FIG. 22A, the center of gravity CG' is located a second horizontal distance 128' from an imaginary vertical plane 130'. The plane 130' is oriented substantially perpendicular to the striking surface 111 and contains the hosel center 122. The distance 128' is the shortest horizontal distance from the plane 130' to the center of gravity CG'.

(3) Referring to FIG. 22B, the center of gravity CG' is located a vertical distance 132' from the ground plane 108. The distance 132' is the shortest vertical distance from the ground plane 108 to the center of gravity CG'.

Referring once again to FIGS. 22A and 22B, the first horizontal distance 124', the second horizontal distance 128', and the first vertical distance 132' may be between about 85% and about 99% of the first horizontal distance 124 (FIG. 3A), the second horizontal distance 128 (FIG. 3A), and the first vertical distance 132 (FIG. 3B), respectively. More preferably, the first horizontal distance 124', the second horizontal distance 128', and the first vertical distance 132' may be between about 88% and about 97% of the first horizontal distance 124 (FIG. 3A), the second horizontal distance 128 (FIG. 3A), and the first vertical distance 132 (FIG. 3B), respectively. Most preferably, the first horizontal distance 124', the second horizontal distance 128', and the first vertical distance 132' may be between about 90% and about 95% of the first horizontal distance 124 (FIG. 3A), the second horizontal distance 128 (FIG. 3A), and the first vertical distance 132 (FIG. 3B), respectively.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A golf club head comprising:
a total mass between about 150 g and about 250 g;
a primary heel-toe moment of inertia;
a light-weight component comprising a connecting member, the light-weight component comprising at least about 8% of the total mass;
a club head component coupled to the light-weight component, the club head component comprising a secondary heel-toe moment of inertia, the secondary heel-toe moment of inertia being between about 85% and about 99% of the primary heel-toe moment of inertia; and
a volume of at least about 300 cm$^3$.

2. The golf club head of claim 1, wherein the secondary heel-toe moment of inertia is between about 88% and about 97% of the primary heel-toe moment of inertia.

3. The golf club head of claim 2, wherein the secondary heel-toe moment of inertia is between about 90% and about 95% of the primary heel-toe moment of inertia.

4. The golf club head of claim 1, wherein the club head component further includes a striking surface having a sweet spot and a face center, the sweet spot being substantially coincident with the face center.

5. The golf club head of claim 1, further comprising:
a primary high-low moment of inertia; and
a secondary high-low moment of inertia being between about 85% and about 99% of the primary high-low moment of inertia.

6. The golf club head of claim 5, wherein the secondary high-low moment of inertia is between about 88% and about 97% of the primary high-low moment of inertia.

7. The golf club head of claim 6, wherein the secondary high-low moment of inertia is between about 90% and about 95% of the primary high-low moment of inertia.

8. The golf club head of claim 1, wherein the light-weight component comprises at least about 20% of the total mass.

9. The golf club head of claim 8, wherein the light-weight component comprises at least about 30% of the total mass.

10. The golf club head of claim 1, the golf club head further comprising a break length, between about 96 mm and about 140 mm, measured at a vertical distance between about 5 mm and about 10 mm from a ground plane.

11. The golf club head of claim 10, wherein the break length is between about 100 mm and about 140 mm.

12. The golf club head of claim 1 further comprising a plurality of reference paths, at least one of the plurality of reference paths comprising an average height between about 20 mm and about 45 mm.

13. The golf club head of claim 12, wherein the average height is between about 36 mm and about 41 mm.

14. The golf club head of claim 12, wherein the average height is between about 37 mm and about 40 mm.

15. The golf club head of claim 1 further comprising a plurality of reference paths, at least one of the plurality of reference paths comprising at least two articulation points.

* * * * *

UNITED STATES PATENT AND TRADEMARK OFFICE
CERTIFICATE OF CORRECTION

PATENT NO. : 7,563,178 B2  Page 1 of 1
APPLICATION NO. : 11/808091
DATED : July 21, 2009
INVENTOR(S) : John J. Rae et al.

It is certified that error appears in the above-identified patent and that said Letters Patent is hereby corrected as shown below:

Title Page item 75

Line 4

Hennosa Beach, CA (US); Kevin should read

Hermosa Beach, CA (US); Kevin

Signed and Sealed this

Twenty-ninth Day of September, 2009

David J. Kappos
*Director of the United States Patent and Trademark Office*